(12) United States Patent
Chen

(10) Patent No.: US 11,937,120 B1
(45) Date of Patent: Mar. 19, 2024

(54) METHOD OF REGULATING TRANSMISSION OF DATA-PACKETS FROM A WIRELESS TERMINAL DEVICE (WTD) AND WTD CONFIGURED FOR SAME

(71) Applicant: CLICKNOW TECHNOLOGIES LTD., Kfar Saba (IL)

(72) Inventor: Ronen Chen, Givatayim (IL)

(73) Assignee: CLICKNOW TECHNOLOGIES LTD., Kfar Saba (IL)

( * ) Notice: Subject to any disclaimer, the term of this patent is extended or adjusted under 35 U.S.C. 154(b) by 0 days.

(21) Appl. No.: 18/131,700

(22) Filed: Apr. 6, 2023

(51) Int. Cl.
H04W 28/02 (2009.01)
H04L 47/2416 (2022.01)
H04W 48/18 (2009.01)

(52) U.S. Cl.
CPC ..... *H04W 28/0268* (2013.01); *H04L 47/2416* (2013.01); *H04W 28/0236* (2013.01); *H04W 48/18* (2013.01)

(58) Field of Classification Search
None
See application file for complete search history.

(56) References Cited

U.S. PATENT DOCUMENTS

| 2002/0181396 | A1* | 12/2002 | Chen | H04L 47/10 370/412 |
| 2002/0194335 | A1 | 12/2002 | Maynard | |
| 2005/0111487 | A1 | 5/2005 | Matta | |
| 2005/0128943 | A1 | 6/2005 | Gibbs | |
| 2006/0023638 | A1 | 2/2006 | Monaco | |
| 2006/0290519 | A1 | 12/2006 | Boate | |
| 2007/0058538 | A1 | 3/2007 | Chiang | |
| 2007/0111568 | A1 | 5/2007 | Ferrari | |
| 2008/0113614 | A1 | 5/2008 | Rosenblatt | |
| 2008/0259813 | A1 | 10/2008 | Matta | |
| 2009/0063680 | A1 | 3/2009 | Bridges | |
| 2010/0020715 | A1 | 1/2010 | Monaco | |
| 2010/0039984 | A1 | 2/2010 | Brownrigg | |
| 2010/0115605 | A1 | 5/2010 | Beattie | |
| 2010/0177699 | A1 | 7/2010 | Klefter | |
| 2010/0208634 | A1 | 8/2010 | Eng | |
| 2011/0197246 | A1 | 8/2011 | Stancato | |
| 2012/0236748 | A1 | 9/2012 | Brownrigg | |
| 2013/0060862 | A1 | 3/2013 | Douillet | |
| 2013/0080618 | A1 | 3/2013 | Balwani | |
| 2013/0227107 | A1 | 8/2013 | Fishman | |
| 2013/0227123 | A1 | 8/2013 | Balwani | |
| 2013/0316728 | A1 | 11/2013 | Bradley | |
| 2014/0286180 | A1 | 9/2014 | Eng | |
| 2014/0334311 | A1 | 11/2014 | Wong | |
| 2014/0351098 | A1 | 11/2014 | Shafer | |

(Continued)

FOREIGN PATENT DOCUMENTS

| CN | 1925423 | * | 1/2006 |
| KR | 20070011795 | * | 1/2006 |

*Primary Examiner* — Andre Tacdiran
(74) *Attorney, Agent, or Firm* — Momentum IP; Marc Van Dyke

(57) ABSTRACT

A method of regulating transmission of data-packets from a wireless terminal device (WTD) and a WTD configured for the same are disclosed herein. In some embodiments, the WTD operates in a first or second or third mode. Specific properties of each of the modes according to various embodiments, as well as mode-transitionings therebetween according to different embodiments are described herein.

12 Claims, 28 Drawing Sheets

(56) References Cited

U.S. PATENT DOCUMENTS

| | | |
|---|---|---|
| 2015/0106514 A1 | 4/2015 | Balwani |
| 2015/0172015 A1* | 6/2015 | Won .................. H04L 5/0073 370/329 |
| 2015/0208331 A1 | 7/2015 | Bridges |
| 2016/0191362 A1 | 6/2016 | Hwang |
| 2016/0239794 A9 | 8/2016 | Shafer |
| 2017/0115910 A1 | 4/2017 | Resch |
| 2017/0230230 A1 | 8/2017 | Theogaraj |
| 2018/0048567 A1 | 2/2018 | Ignatchenko |
| 2018/0098271 A1 | 4/2018 | Bridges |
| 2018/0287692 A1 | 10/2018 | Matyas |
| 2018/0367424 A1 | 12/2018 | Simon |
| 2019/0058731 A1 | 2/2019 | Garg |
| 2019/0081884 A1 | 3/2019 | Spohn |
| 2019/0239144 A1 | 8/2019 | Bridges |
| 2020/0136945 A1 | 4/2020 | Balwani |
| 2020/0238928 A1 | 7/2020 | Sandu |
| 2021/0218653 A1 | 7/2021 | Kannawadi |
| 2021/0400013 A1 | 12/2021 | Vyas |
| 2022/0329565 A1* | 10/2022 | Jiang .................. H04L 63/1425 |

\* cited by examiner

*Prior Art*

*Prior Art*

| Wireless Internet Gateway | Service Set Identifier (SSID) |
|---|---|
| WIAG 100A | Bob Network |
| WIAG 100B | Alice Network |
| WIAG 100C | Laura Network |
| WIAG 100D | Joe Network |
| WIAG 100E | Mia Network |
| WIAG 100F | Shira Network |
| WIAG 100G | John Network |
| WIAG 100H | Stacy Network |
| WIAG 100I | Sarah Network |
| WIAG 100J | Emma Network |

Fig. 2C

*Prior Art*

Time = t1

- 📶 *Bob Network*
- 📶 *Alice Network*
- 📶 *Laura Network*
  Connected, secure  [Disconnect]
- 📶 *Joe Network*
- 📶 *Mia Network*
- 📶 *Shira Network*
- 📶 *John Network*
- 📶 *Stacy Network*
- 📶 *Sarah Network*
- 📶 *Emma Network*

Fig. 3C

Example Visitation Policies
[optionally modulated by Switching costs]

1. Must visit every in-range WIAGs
   At a minimum frequency (e.g. every 2 minutes)

2. Measure QOS of current WIAG (or group thereof) and poor QOS causes more frequent Visitation of other candidates 3. If the competition between WIAGs is "close" we might Increase visitation rate 4. Round robin

Fig. 11A

Example Mode-Transition triggers
(note – mode-transitioning requires Disconnect and connect to another WIAG) [optionally modulated by Switching costs]

1. Monitor packet back-log and is the ratio (e.g. in terms of number of packets or their Aggregate size)
   [for example, if
   |Video Backload|>|Audio backload| > *threshold*, Trigger transition from 2$^{nd}$ to 3$^{rd}$ mode]

2. If there is a burst of packet generation of a Certain type (e.g. in security camera), this causes mode-transition 3. Measure QOS of current WIAG if it's too low We transition (to send different types of packets)

4. Desire to enforce virtual simultaneous parallel channels

Fig. 11B

METHOD OF REGULATING TRANSMISSION OF DATA-PACKETS FROM A WIRELESS TERMINAL DEVICE (WTD) AND WTD CONFIGURED FOR SAME

BACKGROUND

Wireless Terminal Devices (WTD) 150 and Wireless Internet Access Devices 100

FIG. 1A schematically illustrates a Wireless Terminal Device 150 which is one example of what is known as "User equipment (UE)." User equipment (UE) is any device used directly by an end-user to communicate. According to Wikipedia, it can be a hand-held telephone, a laptop computer equipped with a mobile broadband adapter, or any other device. Furthermore (and especially in recent years), "user equipment" (UE) does not require any specific "user"—human or otherwise. Thus, additional examples of "user equipment (UE)" (assuming they are appropriately wirelessly enabled—for example, as suitable Bluetooth Smart devices) include drone devices, wearable digital health devices, home-appliances (e.g. refrigerators, washing machines, dryers), fitness trackers, and security-cameras (e.g. CCV cameras).

In order to stress that fact that no specific "user" (human or otherwise) is required, the present document will usually refer to "wireless terminal devices" WTD 150 rather than user equipment.

Different wireless terminal devices WTD 150 are enabled to wireless communicate using various wireless network protocols such as Wi-Fi, BlueTooth or even satellite internet.

It is known for Wireless Terminal Devices (WTD 150) to wirelessly connect to the Internet via a wireless Internet gateway (e.g. a wireless residential gateway and/or a suitable wireless device including a modem (e.g. a cable modem) connected to the internet and a router). The WTD 150 wirelessly (e.g. wirelessly and often locally) communicates with the wireless Internet gateway using a suitable protocol such as a IEEE 802 protocol and/or a Wifi protocol and/or a BlueTooth protocol (or any other suitable tethering protocol) and/or a cellular-internet protocol and/or a suitable satellite-internet protocol.

In theory, a WTD 150 device (e.g. equipped with multiple onboard modems) can connect connected to the Internet simultaneously via multiple internet gateways (i.e. multiplex for increased connectivity). In practice, almost all WTD 150 commercially available today and in the foreseeable future (e.g. for cost-considerations, simplicity of architecture and/or battery life) have a "at most one Internet Gateway at a time policy" whereby the WTD 150 wirelessly connects to Internet via only a single/exclusive Wireless Internet-Access gateway (WIAG 100). This at most one Internet Gateway at a time policy" is common and well-known in the art. As will be discussed below, when a WTD 150 is connected to the internet via a first WIAG 100, in order to subsequently connect to the internet via a second/different WIAG 100, it is required for the WTD 150 to disconnect from the first WIAG 100 and only afterwards can the WTD 150 connect to the second/different WIAG 100—i.e. "one at a time."

FIG. 1B schematically illustrates a Wireless Internet-Access gateway (WIAG 100)—for example, a Bluetooth gateway, a satellite internet gateway, or a Wifi internet gateway.

FIG. 1C illustrates a Wireless Terminal Device 150 in communication (e.g. one-way or two-way) with a 'remote device 160 via WIAG 100 (which provides Internet access) via the Internet and the WIAG 100 (e.g. which functions as an internet gateway for WTD 150).

For the present document, the terms "local" and "remote" are understood in the context of the field of networking technology, rather than based on geographical distance. Thus, while the geographical Bluetooth range is usually very limited, for other protocols (e.g. cellular or satellite), WTD 150 and WIAG 100 might be local to each other (e.g. even on the same LAN) even if they are separated by considerable distance including many kilometers or more.

In FIG. 1C, WTD 150 and WIAG 100 are in communication with each other (i.e. can exchange wireless communication) but not connected to each other.

In contrast, in FIG. 1D, WTD 150 and WIAG 100 are both in communication with each other and connected to each other—typically, the various wireless protocols provide the appropriate handshake for two devices to connect to each other. At this time (i.e. time of FIG. 1D), all communications (i.e. text communications or streaming communications such as video and audio streams) between WTD 150 and any remote device 160 via the Internet are via WIAG 100D which provides Internet access.

FIGS. 2A-2D, and 3E relates to a specific non-limiting prior art scenario where a WTD 150 is disposed in a physical location that is in local wireless-communication range (e.g. in "WIFI range" or other tethering-range (e.g. Bluerooth range) or other wireless protocol) of a plurality of WIAGs 100A-100J. Each WIAG 100 is connected to the Internet via its respective Internet Service Provider (ISP) (e.g. broadband providers such as AT&T, Comcast, and Charter and Verizon).

FIGS. 2A-2B show the same configuration, where FIG. 2B is more schematic.

In the example of FIGS. 2A-2B, three different ISPs are represented by the 10 of WIAGs 100A-100J—i.e. WIAGs 100A-100J can be divided into 3 groups based on Internet Service Provider (ISP):
  (i) First group (indicated by diagonal shading in FIG. 2A; schematically indicated in FIG. 2B by a circle)— WIAGs 100A, 100D, 100E, and 100H—all WIAGs which access the internet using a first ISP (i.e. equipment thereof) (e.g. the first ISP may be, for example, AT&T);
  (ii) Second group (indicated by brick shading in FIG. 2A; schematically indicated in FIG. 2B by a square) - WIAGs 100B, 100C, 100F, and 100I—all WIAGs which access the internet using a second ISP (i.e. equipment thereof) (e.g. the second ISP may be, for example, Comcast);
  (iii) Third group (indicated by diamond shading in FIG. 2A; schematically indicated in FIG. 2B by a triangle)— WIAGs 100G, 100C, and 100J—all WIAGs which access the internet using a third ISP (i.e. equipment thereof) (e.g. the third ISP may be, for example, Verizon.

It is common in the art for a WTD 150 to list (e.g. by SSID—see FIG. 2C) the various WIAGs that are in currently in communication (or historically in communication, depending on the specific OS or how its configured)—e.g. by SSID. FIG. 2D illustrate a non-limiting GUI listing of the various networks.

FIGS. 2B and 3A-3E show a prior art scenario related to "one WIAG at a time." At time t0, WTD 150 is in communication with 10 WIAGs but connected to none of them (see FIG. 2B).

Later, at time t1, WTD 150 is connected to WIAG 100C (FIGS. 3B-3C).

Later, at time t2, WTD 150 is in communication with 10 WIAGs but connected to none of them (see FIG. 3D).

Later, at time t3, WTD 150 is connected to WIAG 100JK (FIG. 3E). Detecting ISP of a given WIAG—It is possible to detect the IP (e.g. IPc4 or IPc6) address of the first-hop router in the ISP's network. For IPv4, this should be provided by DHCP as a 'default gateway'. For IPv6, this may be provided by Neighbor Discovery. It is possible to maintain (e.g. in memory of WTD 150) a table (or other data structure) mapping IP addresses (e.g. of the first-hope router) to the identity of the ISP—by measuring the address of the first-hop router, it is possible to detect the identify of the ISP which provides Internet-access to a given WIAG.

Reference is now made to FIGS. 3A-3E where, once again, Wireless Terminal Device (WTD) 150 is disposed in the vicinity of the plurality of WIAGs 100A-100J. This may represent a system where a user holding a WTD 150 is walking in an indoor shopping mall, and each store (or eatery) in this indoor mall has its own wireless local area network (WLAN) including a wireless router 100 connected to the Internet using its respective ISP. Thus, one example related to FIGS. 3A-3E, each of WIAGs 100A-100J resides in a different respective WLAN (wireless local area network).

A Discussion of FIG. 4

FIG. 4 is a schematic block diagram an exemplary WTD 150—e.g. a mobile phone, a cellular phone, a tablet, a laptop, drone devices, wearable digital health devices, home-appliances (e.g. refrigerators, washing machines, dryers), fitness trackers, and security-cameras (e.g. CCV cameras)—each having suitable wireless communications capability.

Any element of FIG. 4 may be implemented by any suitable combination of software, electronic circuitry (e.g. analog or digital circuitry—including but not limited to volatile or non-volatile memory, modems, microprocessors, CPU, GPU, FPGA) or firmware.

Illustrated in FIG. 4 are:
- (i) Physical sensors(s) 340—e.g. touchscreen, camera, microphone, or other sensors such as an accelerometer, a thermometer, or an ultrasound sensor or photodetector (IR sensor);
- (ii) A communications module 310 which, for example, can connect to or disconnect from a WIAG 100 (e.g. according to connect or disconnect instructions) or which can wirelessly send encoded packets 312;
- (iii) a packetizer 320 (discussed below) which converts input data (e.g. text data, or a portion of a file, or a media stream or portion thereof) into encoded (optionally encrypted) packets 324 suitable to be sent over the Internet;
- (iv) a plurality of applications 330[1]-330[N] which are installed or reside on WTD 150. Examples could be WhatsApp, Skype, a browser (e.g. Chrome® from Google®).

In the example of FIG. 4, WTD 150 provides at least 3 services (e.g. in one non-limiting example, provided by operating-system OS software executing on WTD 150).:
- (i) Service A (connect/disconnect)—e.g. an identifier of a WTD 150 (e.g SSID) along with a "connect" or "disconnect" instructions (e.g. generated by 340 and/or one of the applications) is provided to module 310 to cause WTD 150 to connect to or disconnect from a WIAG 100;
- (ii) Service B (send-packets-to-destination service—packets and optionally an identifier of a destination [e.g. an IP of a remote device 160] are provided to module 310 and these packets wirelessly are sent out of WTD 150—e.g. to WIAD 100 and optionally to a remote destination (e.g. 160) beyond.

Any onboard device-service may, for example, by performed by any combination of execution of software (e.g. onboard operating system (OS) software) or by firmware or by hardware (FPGA).

Broken Infrastructure or Other Events (e.g. Catastrophic Events) Damaging Internet Access and/or Portions of the Internet In the 21th century two trends may be observed—while the population at large has become more dependent upon Internet access, the number of threats to such access, and even to portions of the Internet, is ever increasing. Such potential threats include but are not limited to the potential for war (e.g. nuclear war), potential for Climate Events (e.g. more powerful hurricanes) software bugs in critical Infrastructure, terrorism, and power outages (e.g. rolling brown-outs or blackouts or sabotaged power-networks).

Such threats may be extremely localized (e.g. a power outage in a single building—a building configured as a Faraday cage), or may have a wider geographical scope (e.g. affecting significant portions of a city or even metropolitan area or an entire state or states).

There is an ongoing need for apparatus, systems and methods for providing Wireless Terminal Devices 150 (e.g. cell phones, tablets, laptops) internet access, even when cell phone access (or satellite access) is not available, and when local WIAGs 100 lose (e.g. entirely, or to a great extent) access to the Internet.

The following US pre-grant publications are each incorporated herein by reference in their entireties:
20210400013; US pre-grant publication 20210218653; US pre-grant publication 20200238928; US pre-grant publication 20200136945; US pre-grant publication 20190239144; US pre-grant publication 20190081884; US pre-grant publication 20190058731; US pre-grant publication 20180367424; US pre-grant publication 20180287692; US pre-grant publication 20180098271; US pre-grant publication 20180048567; US pre-grant publication 20170230230; US pre-grant publication 20170115910; US pre-grant publication 20160239794; US pre-grant publication 20160191362; US pre-grant publication 20150208331; US pre-grant publication 20150106514; US pre-grant publication 20140351098; US pre-grant publication 20140334311; US pre-grant publication 20140286180; US pre-grant publication 20130316728; US pre-grant publication 20130227123; US pre-grant publication 20130227107; US pre-grant publication 20130080618; US pre-grant publication 20130060862; US pre-grant publication 20120236748; US pre-grant publication 20110197246; US pre-grant publication 20100208634; US pre-grant publication 20100177699; US pre-grant publication 20100115605; US pre-grant publication 20100039984; US pre-grant publication 20100020715; US pre-grant publication 20090063680; US pre-grant publication 20080259813; US pre-grant publication 20080113614; US pre-grant publication 20070111568; US pre-grant publication 20070058538; US pre-grant publication 20060290519; US pre-grant publication 20060023638; US pre-grant publication 20050128943; US pre-grant publication 20050111487; US pre-grant publication 20020194335; US pre-grant publication.

Non-media-stream data NMS Data

Non-media-stream data (NMSD) or simply non-media-stream (NMS) refers to all data other than data of an audio stream or video stream. The term "non-media-stream" refers to data other than data of a media stream, and encompasses non-stream data. NMS could include text, a Microsoft Excel® file, a pdf file, etc.

SUMMARY OF EMBODIMENTS

Overcoming Outages or Near-Outages of Internet Access

Embodiments of the invention relate to the using a WTD 150 to communicates (e.g. employing presently disclosed methods and/or systems) with the ""outside world" (e.g. a remote device 160 via the Internet) in situations of "Internet outage."

The present inventor has observed that even when there is a perceived "complete Internet outage" conventionally wiping out the ability to access the Internet, it is possible to utility this 'residual Internet access,' even (i.e. under these conditions) to provide different (i) non-media-stream NMS data (see the end of the background section for the definition of NMS data), (ii) audio and (iii) video channels between WTD 150 and one or more remote devices 160 disposed 'remotely' via the Internet.

Switching between these channels entails disconnecting from one WIAG then subsequently connecting the same WIAG or (more typically) to another WIAG.

It is possible to "cycle through" these channels at a certain frequency (e.g. through all channels within a time period whose duration is at most 5 minutes or 3 minutes or 2 minutes or shorter) to provide "virtual simultaneous channels" segregated by (i) NMS data; (ii) audio data; and (iii) video data.

For the present document, audio refers to an audio stream and video refers to a video stream In one example of 'residual Internet access,' different WIAGs connect to the internet via different cellular networks (e.g. GSM). During a 'disaster event,' most but not all cellular towers go down. In this situation, the cellular network would not have the capacity to handle its load, and the load might be increased as more and more people attempt to communicate during a 'stressful time.' For example, the amount of multiplexing required might skyrocket and the network might "crash" or nearly crash. Nevertheless, some capacity might remain.

In another example, there is intermittent GSM access between a WIAG and a cellular tower(s) due to manmade or nature factors In this situation (i.e. where there is only 'residual Internet access collectively provided by the WIAGs), the portions of any network with such residual capacity (and the amount of capacity) might fluctuate within a network (and/or between networks) over time. Thus, in one example, between 2 PM and 2:03 PM, the Verizon network is capable of providing more bandwidth and/or lower bandwidth than the AT&T network, while between 2:05 PM and 2:15 PM the AT&T network is capable of providing more bandwidth and/or lower bandwidth than the Verizon network In another example, the QOS available for/provided by a first WIAG on the AT&T network is better than that of a second WIAG on the AT&T network between 4 PM and 4:05 PM, while the situation is reversed between 5 PM and 5:45 PM.

The present inventors now disclose that "not all packets are created equally" and is useful to segregate as follows: (i) packets derived from NMS data are sent (e.g. exclusively) via a first WIAG; (ii) packets derived from audio data are sent (e.g. exclusively) via a second WIAG; and (iii) packets derived from video data are sent (e.g. exclusively) via a third WIAG.

Even though this may impose a switching cost (i.e. disconnecting from a WIAG and connecting to another WIAG including the handshake overhead, etc) and may delay packets (i.e. there may be a need to 'artificially' hold back packets that would have otherwise been sent), the present inventors believe that in specific circumstances (e.g. related to Internet outages) this gives a better overall QOS.

For example, various candidate WIAGs are probed and evaluated (e.g. scored and/or rated) in terms of media-type specific ability to provide QOS—i.e. a good QOS for text data (e.g. low ping) may not be the same as a QOS for audio stream data (e.g. based on retaining packet-order—e.g. measured by jitterbuffer).

The present inventors have analyzed commercially available WTDs and operating systems OS thereof and have noticed that: (i) even if the generated packets are encrypted, it is possible to eavesdrop (even on secure OSs) on packets generated by an onboard packet-generation service and to detect the existence of individual packets, detect properties thereof, and to use this to advantage to classify a packet (even encrypted) as being derived from NMS or audio or video.

Furthermore, it is possible to override (i.e. even introducing delay)the packet-sending service, and thus to segregate between packets derived from different data/media types to provide: (i) a first mode where only packets derived from NMS are sent—and these packets may be sent via a WIAD 100 which is/was "custom-analyzed" based on ability to specifically provide QOS for NMS; (ii) a second mode where only packets derived from audio are sent—and these packets may be sent via a WIAD 100 which is/was "custom-analyzed" based on ability to specifically provide QOS for audio; (iii) a third mode where only packets derived from video are sent—and these packets may be sent via a WIAD 100 which is/was "custom-analyzed" based on ability to specifically provide QOS for video.

A method of operating a wireless terminal device (WTD) which enforces an "at most one Internet Gateway at a time policy" such that the WTD is wirelessly connected to at most one Wireless Internet-Access gateway at a time, terminal device (WTD) is configured to provide at least the following onboard device-services: (i) an encode-into-packet service; and (ii) a send-packet(s)-to-remote-destination service, the wireless terminal device (WTD) being disposed for wireless communication with a plurality of candidate Wireless Internet-Access gateways (WIAGs), the method comprising:

a. eavesdropping on the packets which are encoded by the WTD in the context of the encode-into-packet service provided by the WTD;

b. respectively classifying each eavesdropped packet as one of: (i) a packet encoding audio; (ii) a packet encoding video; and (iii) a packet encoding non-media-stream (NMS) data;

c. probing each of the candidate Wireless Internet-Access gateways (WIAGs) of a plurality of candidate Wireless Internet-Access gateways (WIAGs), to respectively measure a set of internet connective parameters for each candidate Internet gateway;

d. based on analysis of internet connectivity parameters, and in accordance with optimizing QOS, designating a first of the candidate WIAGs as NMS-preferred, a second of the candidate WIAGs as audio-preferred, and a third of the candidate WIAGs as video-preferred, the first, second and third WIAGs being distinct from each other;

e. causing the wireless terminal device (WTD) to operate either in a first mode, a second mode or a third mode, one mode exclusively at a time, such that:

(i) when the wireless terminal device (WTD) is in the first mode, the wireless terminal device (WTD) is exclusively wirelessly connected to the NMS-preferred WIAG;

(ii) when the wireless terminal device (WTD) is in the first mode, the send-packet(s)-to-remote-destination service is partially overridden so as to: (A) block-and-cache outgoing packets (e.g. block and cache all such packets) that were classified as encoding audio; (B) block-and-cache outgoing packets (e.g. block and cache all such packets) that were classified as encoding video; and (C) allow outgoing packets that were classified as encoding non-media-stream (NMS) data to be wirelessly transmitted, to the NMS preferred WIAG in the context of the send-packet(s)-to-remote-destination service;

(iii) when the wireless terminal device (WTD) is in the second mode, the wireless terminal device (WTD) is exclusively wirelessly connected to the audio-preferred WIAG;

(iv) when the wireless terminal device (WTD) is in the second mode, the send-packet(s)-to-remote-destination service is partially overridden so as to: (A) block-and-cache outgoing packets (e.g. block and cache all such packets) that were classified as encoding NMS data; (B) block-and-cache outgoing packets (e.g. block and cache all such packets) that were classified as encoding video; and (C) allow outgoing packets that were classified as encoding audio to be wirelessly transmitted, to the audio preferred WIAG in the context of the send-packet(s)-to-remote-destination service;

(v) when the wireless terminal device (WTD) is in the third mode, the wireless terminal device (WTD) is exclusively wirelessly connected to the video-preferred WIAG; and (vi) when the wireless terminal device (WTD) is in the third mode, the send-packet(s)-to-remote-destination service is partially overridden so as to: (A) block-and-cache outgoing packets (e.g. block and cache all such packets) that were classified as encoding NMS data; (B) block-and-cache outgoing packets (e.g. block and cache all such packets) that were classified as encoding audio; and (C) allow outgoing packets that were classified as encoding video to be wirelessly transmitted, to the video preferred WIAG gateway in the context of the send-packet(s)-to-remote-destination service, In some embodiments, the method further requires the wireless terminal device (WTD) to operate in each of the first, second and third modes, sequentially in any order and one at a time, and wherein steps c and d are performed more than once to respectively change identifies of each of the NMS-preferred, audio-preferred and video-preferred WIAGs.

In some embodiments, mode transition requires disconnect from the old gateway followed by connect to the new gateway. For example, a mode-set may be defined as {first mode, second mode, third mode} and every transition from one member of the mode-set to another member of the mode-set requires disconnecting from an earlier-time WIAG and subsequently connecting to a later-time WIAG, and wherein: (i) if the transition is away from the first mode the earlier-time WIAG is the NSM-preferred WIAG, (ii) if the transition is away from the second mode the earlier-time WIAG is the audio-preferred WIAG, (iii) if the transition is away from the third mode the earlier-time WIAG is the video-preferred WIAG, (iv) if the transition is into the first mode the later-time WIAG is the NSM-preferred WIAG, (v) if the transition is into the second mode the later-time WIAG is the audio-preferred WIAG, (vi) if the transition is into the third mode the later-time WIAG is the video-preferred WIAG.

In some embodiments, carried out to perform at least one of the following, at least once: (i) the WTD is operating in the first mode, at least one packet-event selected from a packet-event-set named 1-to-2_PACKET_EVENT_SET triggers a first-to-second-mode mode-transition which requires disconnecting from the NSM-preferred WIAG and then connecting to the audio-preferred WIAG, 1-to-2_PACKET_EVENT_SET having 3 members and being defined as follows: {a detected generation of audio packets, a predicted generation of audio packets, an increase in a ratio between: (A) an aggregate packet-payload of encoded but unsent audio packets; and (B) an aggregate packet-payload of encoded but unsent NSM packets (e.g. if we are 'dwelling' in the first mode and there is an audio burst (e.g. a sound on the usually-quiet microphone), we disconnect and connect to the audio-designated gateway) (ii) the WTD is operating in the first mode, at least one packet-event selected from a packet-event-set named 1-to-3_PACKET_EVENT_SET triggers a first-to-third-mode mode-transition which requires disconnecting from the NSM-preferred WIAG and then connecting to the video-preferred WIAG, 1-to-3_PACKET_EVENT_SET having 3 members and being defined as follows: {a detected generation of video packets, a predicted generation of video packets, an increase in a ratio between: (A) an aggregate packet-payload of encoded but unsent video packets; and (B) an aggregate packet-payload of encoded but unsent NSM packets (e.g. if we are 'dwelling' in the first mode and there is an video burst (e.g. security camera detect motion), we disconnect and connect to the video-designated gateway)

In some embodiments, carried out to perform the following, at least once: the WTD is operating in the second mode, at least one packet-event selected a packet-event-set named 2-to-3_PACKET_EVENT_SET triggers a second-to-third-mode mode-transition which requires disconnecting from the audio-preferred WIAG and then connecting to the video-preferred WIAG, 2-to-3_PACKET_EVENT_SET having 3 members and being defined as follows: {a detected generation of video packets, a predicted generation of video packets, an increase in a ratio between: (A) an aggregate packet-payload of encoded but unsent video packets; and (B) an aggregate packet-payload of encoded but unsent audio packets. For example, if we are 'dwelling' in the first mode and there is an video burst (e.g. security camera detect motion), we disconnect and connect to the video-designated gateway.

In some embodiments, carried out to perform all of the following: (e.g. we 'strongly require' updating all of the NMS/text, audio and video gateways and we 'use this' for mode transition)

(i) an earlier-time mode-transitioning into the first mode and subsequently a later-time mode-transitioning into the first mode such the NSM-preferred WIAG at a time of the earlier mode-transitioning into the first mode is different from the NSM-preferred WIAG at a time of the later mode-transitioning into the first mode;

(ii) an earlier-time mode-transitioning into the second mode and subsequently a later-time mode-transitioning into the second mode such the audio-preferred WIAG at a time of the earlier mode-transitioning into the second mode is different from the audio-preferred WIAG at a time of the later mode-transitioning into the second mode; and (iii) an earlier-time mode-transitioning into the third mode and subsequently a later-time mode-transitioning into the third mode such the video-preferred WIAG at a time of the earlier mode-transitioning into the third mode is different from the video-preferred WIAG at a time of the later mode-transitioning into the third mode.

a mode-set is defined as {first mode, second mode, third mode} and at least one transition from one In some embodiments, performed so that, at least some of the time, newer internet packets of a media-type which matches the current mode are transmitted out of the WTD before older internet packets of a media-type which does not match the current mode, the older internet packets being held until the WTD transitions into a mode which matches their media type.

In some embodiments, performed so that, at least some of the time, newer internet packets of a media-type which matches the the block-and-cache outgoing packets that were classified as encoding NMS data performed when the WTD is in the second mode requires preventing their transmission until the transitions out of the second mode and into the first mode, the second-to-first-mode transitioning requiring disconnecting from the audio-preferred WIAG and subsequently connecting to the NSM-preferred WIAG.

In some embodiments, performed so that, at least some of the time, newer internet packets of a media-type which matches the the block-and-cache outgoing packets that were classified as encoding video data performed when the WTD is in the second mode requires preventing their transmission until the transitions out of the second mode and into the third mode, the second-to-third-mode transitioning requiring disconnecting from the audio-preferred WIAG and subsequently connecting to the video-preferred WIAG.

In some embodiments, performed so that, at least some of the time, newer internet packets of a media-type which matches the the block-and-cache outgoing packets that were classified as encoding audio data performed when the WTD is in the third mode requires preventing their transmission until the transitions out of the third mode and into the second mode, the third-to-second-mode transitioning requiring disconnecting from the video-preferred WIAG and subsequently connecting to the audio-preferred-WIAG.

In some embodiments, performed so that, at least some of the time, newer internet packets of a media-type which matches the one Internet connectivity parameters is "ping" which is used to measure latency, and a lower ping value increases a relative suitability of a candidate WIAG as NMS-preferred relative to a suitability of the candidate WIAG as audio or video-preferred.

In some embodiments, performed so that, at least some of the time, newer internet packets of a media-type which matches the one Internet connectivity parameters is "jitterbuffer" which is used to measure the ability to retain order of remotely-transmitted power, and a better packet-order-retaining ability a relative suitability of a candidate WIAG as audio-preferred relative to a suitability of the candidate WIAG as NMS or video-preferred.

In some embodiments, performed so that, at least some of the time, newer internet packets of a media-type which matches the wherein the classified packets are unencrypted and their content is inspected as input to the classifying.

In some embodiments, performed so that, at least some of the time, newer internet packets of a media-type which matches the wherein the classified packets are encrypted, their content is not inspected as input to the classifying, and an event-log of events which occur on the WTD when the encrypted packets are generated/encoded serves as input to the classifying.

In some embodiments, all of the first, second and third modes are multicast modes where packets transmitted from the WTD while in the first or second or third modes are multi-cast transmitted, the method further comprising: prior to performance of step (e), operating the WTD is a prior mode that is (i) not a multi-cast mode and (ii) not the first mode and (iii) not the second mode and (iv) not the third mode.

In some embodiments, exiting the prior mode to transition therefrom into the first or second or third mode is contingent upon a QOS-parameter of the WTD while in the prior mode being below a threshold level.

In some embodiments, the exiting of the prior mode so as to transition therefrom into the first or second or third mode is contingent upon detection of WIAG disconnect event that occurs while in the prior mode.

In some embodiments, the exiting of the prior mode so as to transition therefrom into the first or second or third mode is contingent upon a QOS-parameter of the WTD while in the prior mode being below a threshold level.

A wireless terminal device (WTD) configured to enforce an "at most one Internet Gateway at a time policy" such that the WTD is wirelessly connected to at most one Wireless Internet-Access gateway at a time, terminal device (WTD) is configured to provide at least the following onboard device-services: (i) an encode-into-packet service; and (ii) a send-packet(s)-to-remote-destination service, the wireless terminal device (WTD) being disposed for wireless communication with a plurality of candidate Wireless Internet-Access gateways (WIAGs), the WTD comprising:

a processor; and a non-transitory computer readable storage medium for instructions execution by the processor, the non-transitory computer readable storage medium having stored:

a. instructions, that when executed by the processor, eavesdrop on the packets which are encoded by the WTD in the context of the encode-into-packet service provided by the WTD;

b. instructions, that when executed by the processor, respectively classify each eavesdropped packet as one of: (i) a packet encoding audio; (ii) a packet encoding video; and (iii) a packet encoding non-media-stream (NMS) data;

c. instructions, that when executed by the processor, probe each of the candidate Wireless Internet-Access gateways (WIAGs) of a plurality of candidate Wireless Internet-Access gateways (WIAGs), to respectively measure a set of internet connective parameters for each candidate Internet gateway;

d. instructions, that when executed by the processor, designate, based on analysis of internet connectivity parameters, and in accordance with optimizing QOS, a first of the candidate WIAGs as NMS-preferred, a second of the candidate WIAGs as audio-preferred, and a third of the candidate WIAGs as video-preferred, the first, second and third WIAGs being distinct from each other;

e. instructions, that when executed by the processor, cause the wireless terminal device (WTD) to operate either in a first mode, a second mode or a third mode, one mode exclusively at a time, such that:
  (i) when the wireless terminal device (WTD) is in the first mode, the wireless terminal device (WTD) is exclusively wirelessly connected to the NMS-preferred WIAG;
  (ii) when the wireless terminal device (WTD) is in the first mode, the send-packet(s)-to-remote-destination service is partially overridden so as to: (A) block-and-cache outgoing packets that were classified as encoding audio; (B) block-and-cache outgoing packets that were classified as encoding video; and (C) allow outgoing packets that were classified as encoding non-media-stream (NMS) data to be wirelessly transmitted, to the NMS preferred WIAG in the context of the send-packet(s)-to-remote-destination service;
  (iii) when the wireless terminal device (WTD) is in the second mode, the wireless terminal device (WTD) is exclusively wirelessly connected to the audio-preferred WIAG;
  (iv) when the wireless terminal device (WTD) is in the second mode, the send-packet(s)-to-remote-destination service is partially overridden so as to: (A) block-and-cache outgoing packets that were classified as encoding NMS data; (B) block-and cache outgoing packets that were classified as encoding video; and (C) allow outgoing packets that were classified as encoding audio to be wirelessly transmitted, to the audio preferred WIAG in the context of the send-packet(s)-to-remote-destination service;
  (v) when the wireless terminal device (WTD) is in the third mode, the wireless terminal device (WTD) is exclusively wirelessly connected to the video-preferred WIAG; and
  (v) when the wireless terminal device (WTD) is in the third mode, the send-packet(s)-to-remote-destination service is partially overridden so as to: (A) block-and-cache outgoing packets that were classified as encoding NMS data; (B) block-and-cache outgoing packets that were classified as encoding audio; and (C) allow outgoing packets that were classified as encoding video to be wirelessly transmitted, to the video preferred WIAG gateway in the context of the send-packet(s)-to-remote-destination service, wherein the instructions, that when executed by the processor, require the wireless terminal device (WTD) to operate in each of the first, second and third modes, sequentially in any order and one at a time such that the probing and the designating are performed more than once to respectively change identifies of each of the NMS-preferred, audio-preferred and video-preferred WIAGs.

BRIEF DESCRIPTION OF THE DRAWINGS

FIGS. 2C-2D and 3C shows prior art SSID lists,
FIGS. 11A-11B list various example policies or triggers according to different embodiments.

DETAILED DESCRIPTION

Introductory Remarks

Figure 1B:
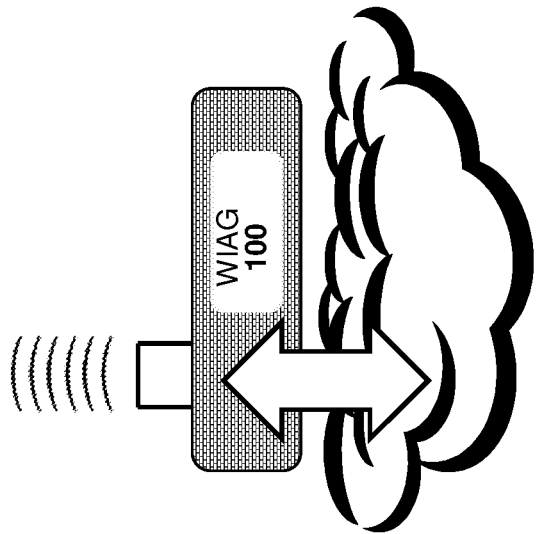
FIGS. 1A-1D, 2A-2B, 3B and 3D-3E show block diagrams of various electronic devices according to the prior art.
Figure 1A:
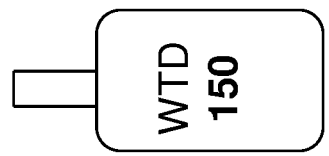
Figure 1C:
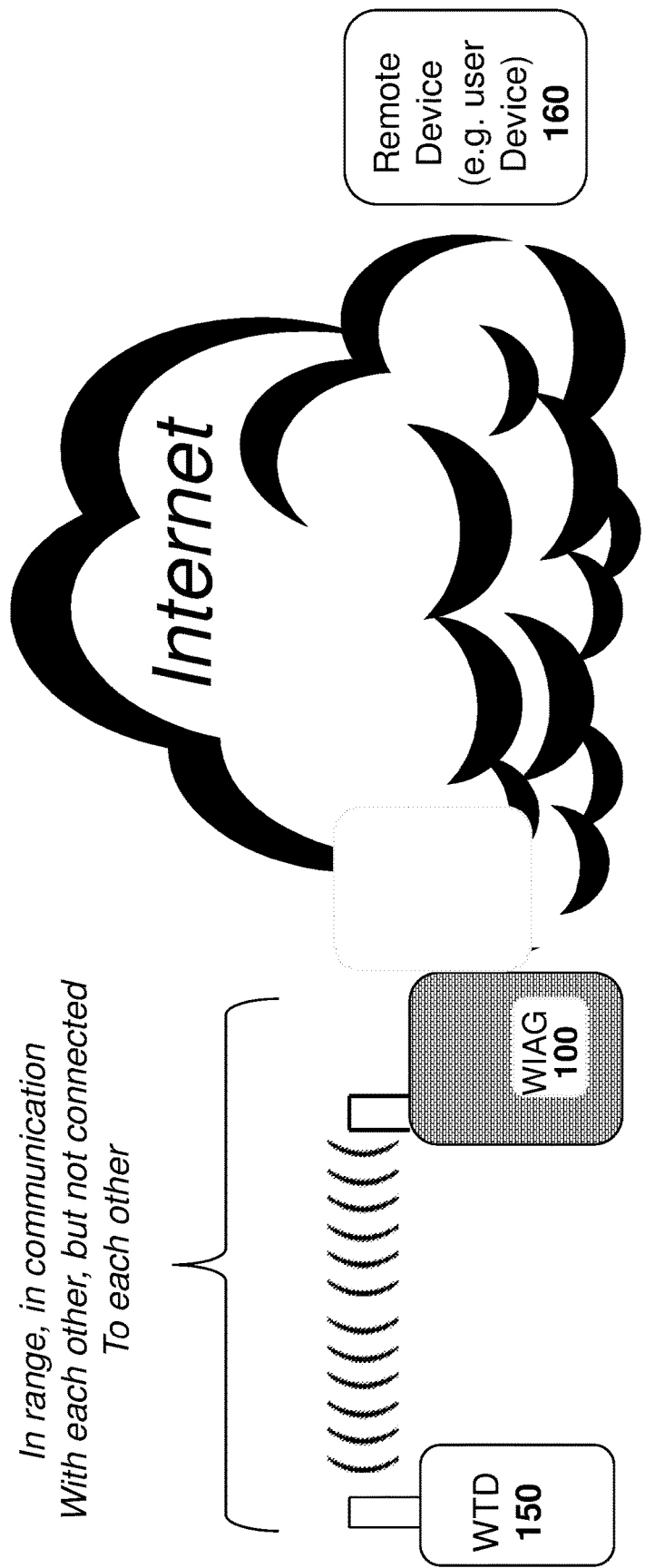
Figure 1D:
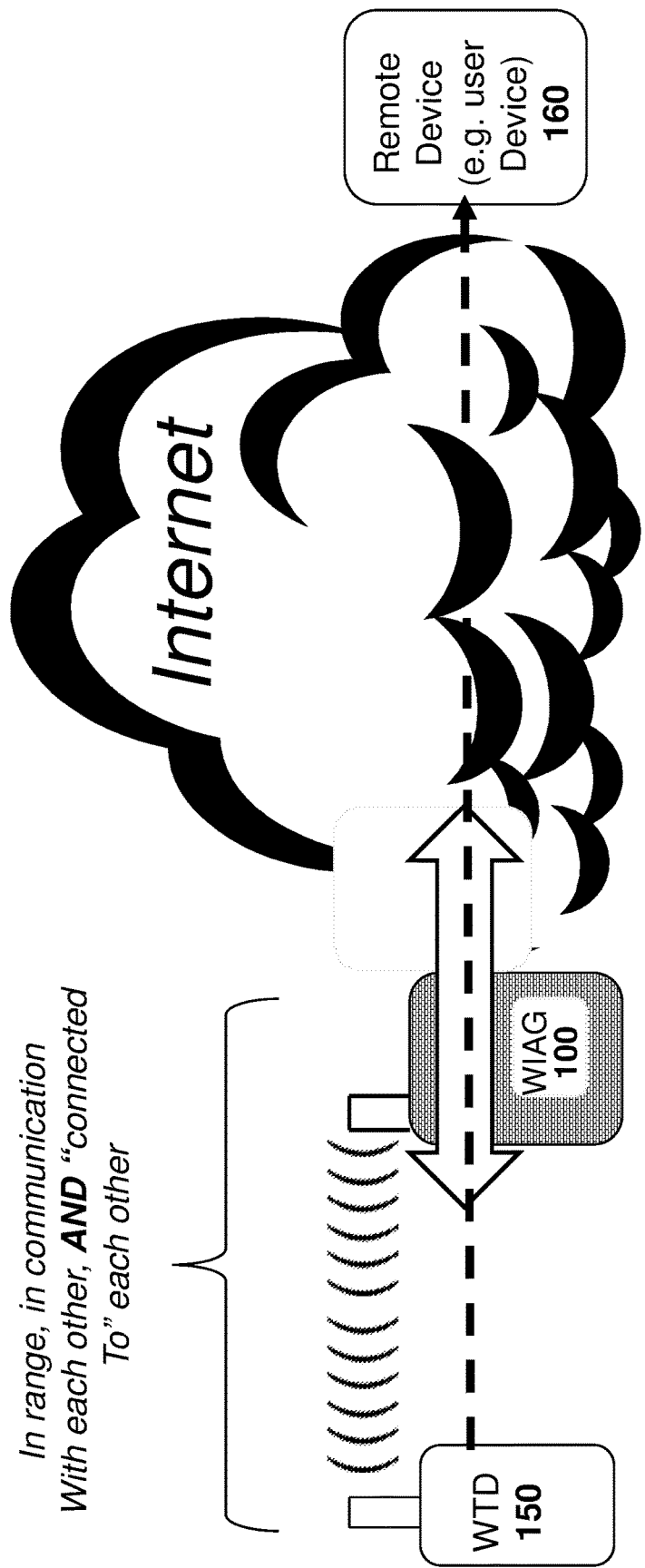
Figure 2A:
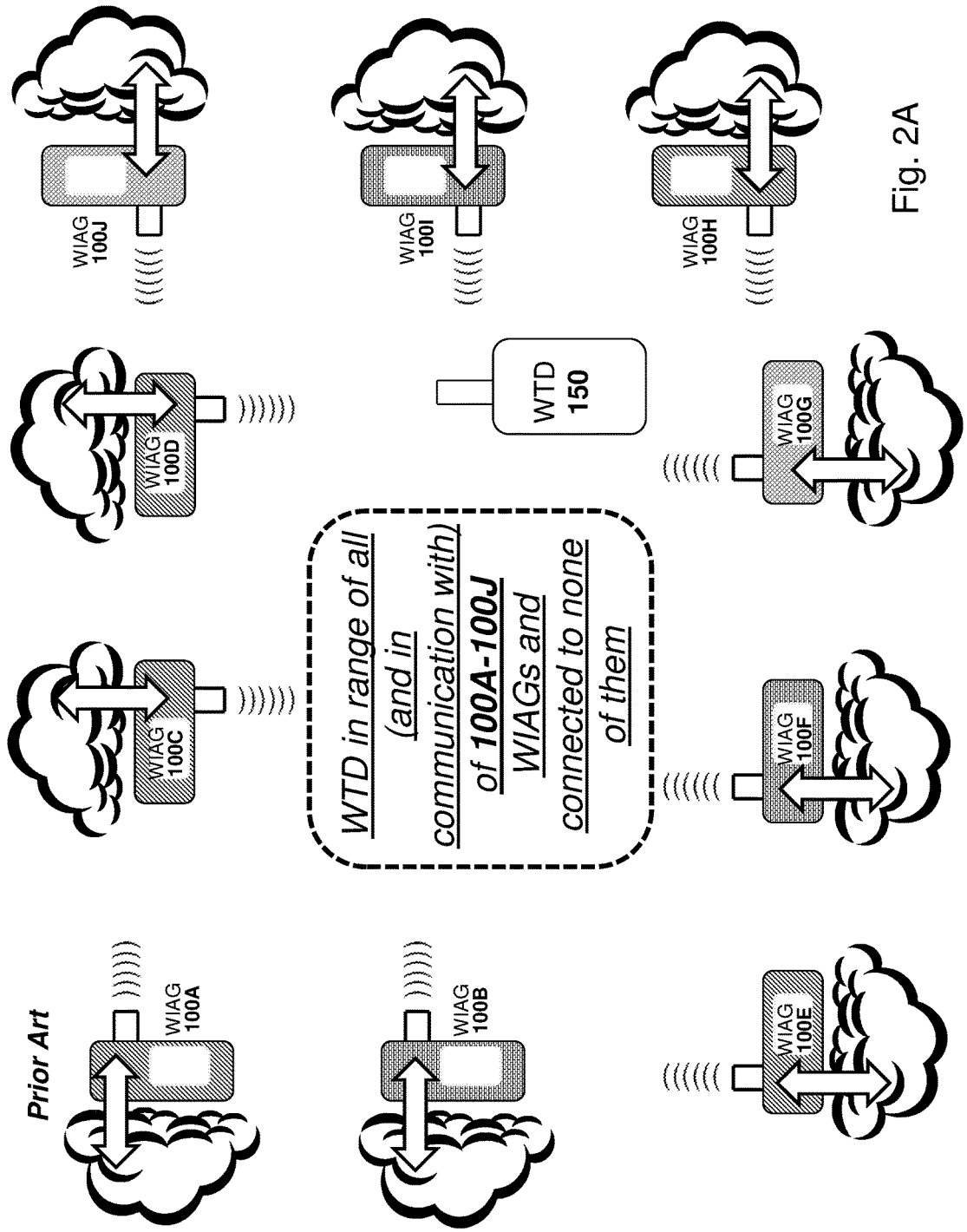
Figure 2B:
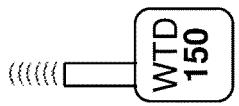
Figure 2D:
Figure 3A:
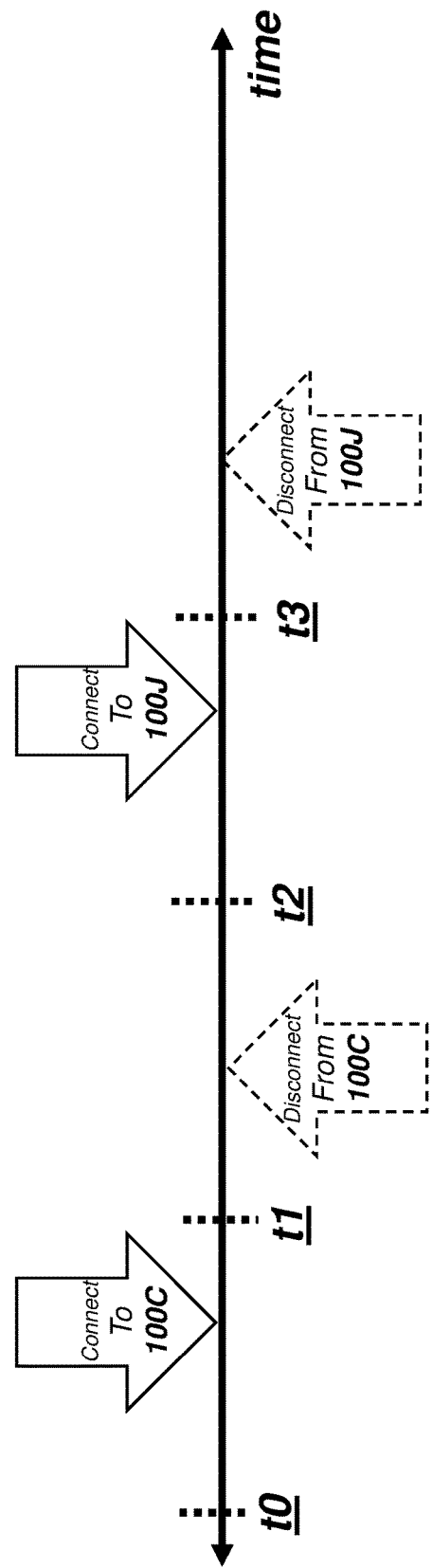
FIG. 3A shows a prior art timeline.
Figure 3B:
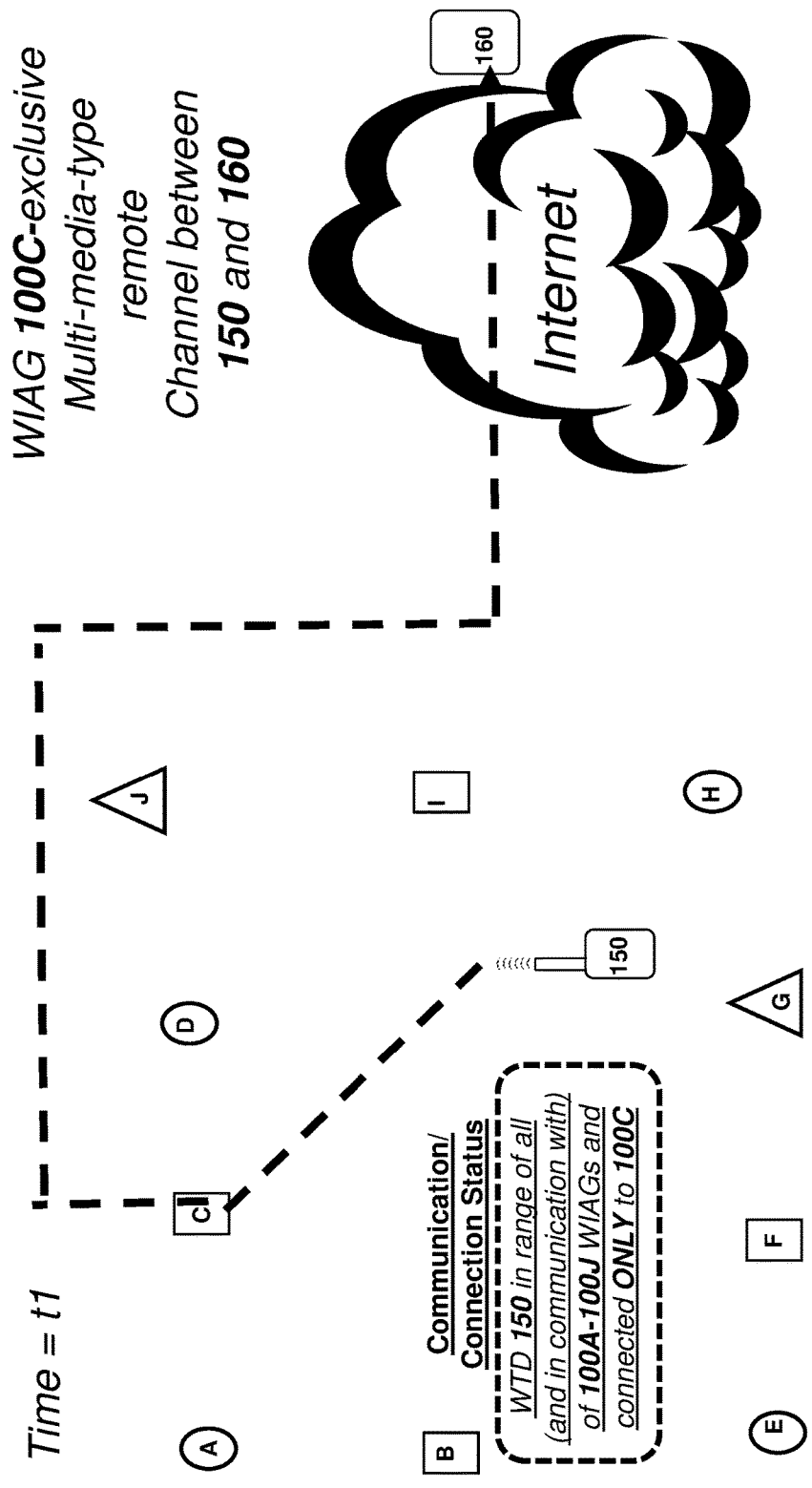
Figure 3D:
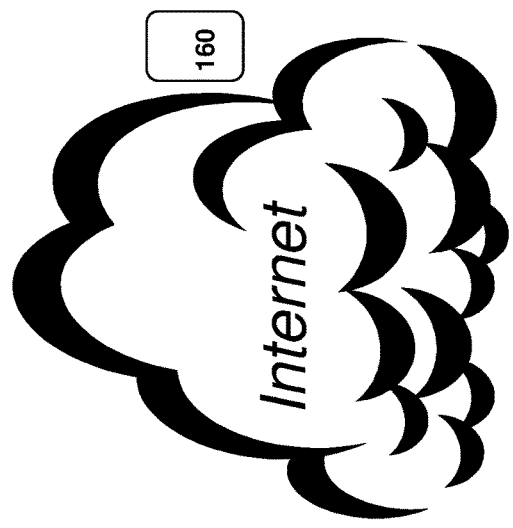
Figure 3E:
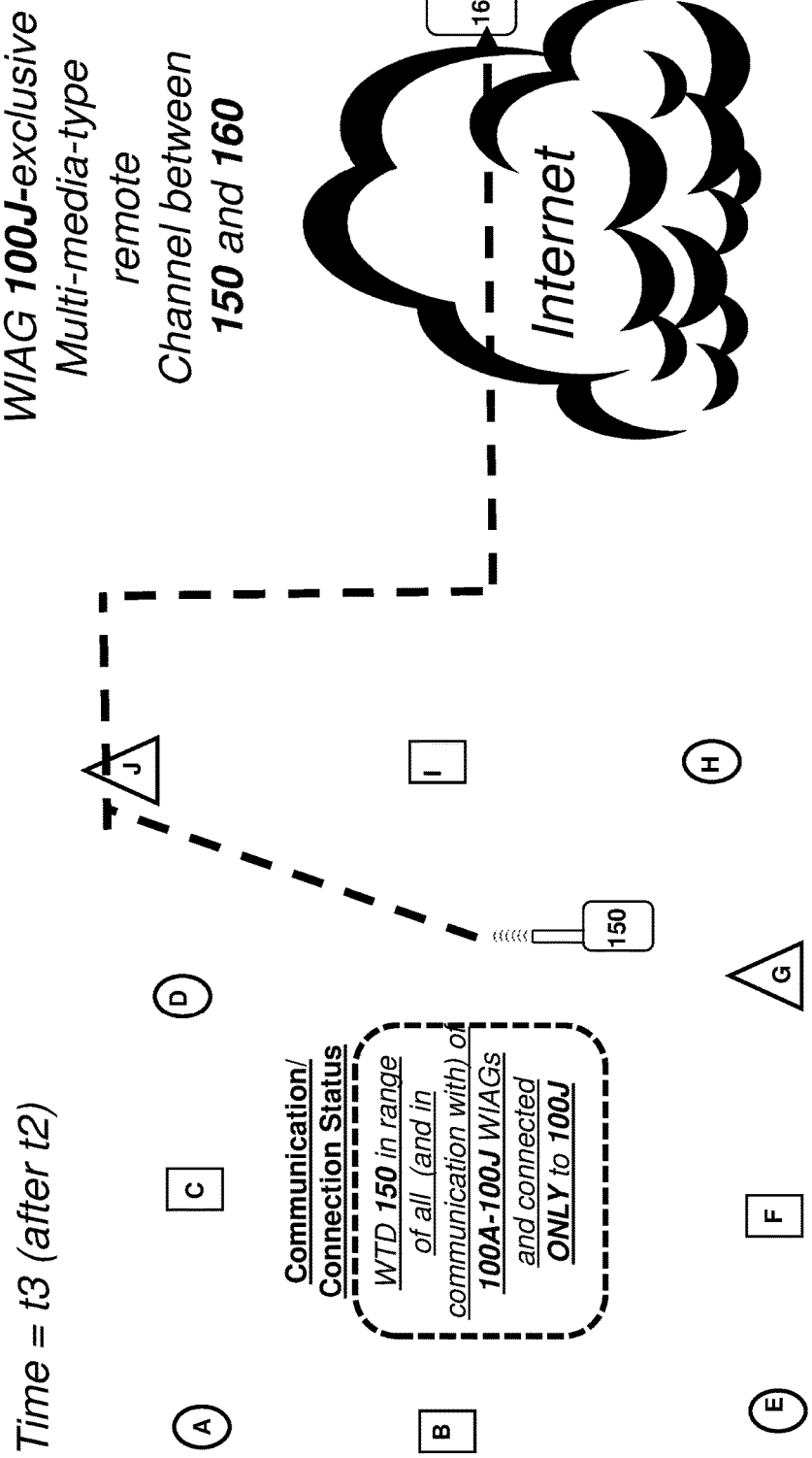

A method of operating a wireless terminal device (WTD) (e.g. 150) is disclosed herein. The WTD may enforce an "at most one Internet Gateway at a time policy" such that the WTD is wirelessly connected to (e.g. Wifi-connected or Bluetooth-connected or Satellite connected) with at most one Wireless Internet-Access gateway (WIAG 150) at a time via which (i.e. via this at most one WIAG) the WTD "connects to the Internet."

For the present document, non-media-stream data (NMSD) or simply non-media-stream (NMS) refers to all data other than data of an audio stream or video stream. The term "non-media-stream" refers to data other than data of a media stream, and encompasses non-stream data. NMS could include text, a Microsoft Excel® file, a pdf file, etc.

In embodiments of the invention, the wireless terminal device (WTD) is configured to provide at least the following onboard device-services: (i) an encode-into-packet service (see "Service C" of FIG. 4) and (ii) a send-packet(s)-to-remote-destination service (see "Service B "of FIG. 4). Any onboard device-service may, for example, by performed by any combination of execution of software (e.g. onboard operating system (OS) software) or by firmware or by hardware (FPGA).

While the method is performed, the wireless terminal device (WTD) is disposed for wireless communication with a plurality of candidate Wireless Internet-Access gateways (WIAGs). The WTD may, during the performance of the network, connect to and disconnect from the set of plurality of candidate Wireless Internet-Access gateways (WIAGs) $\{WIAG_1, WIAG_2 \ldots LWA\text{-}WIAG_N\}$ (N≥3) which are disposed to be in communication with the WTD. In embodiments of the invention, the method comprises:

a. eavesdropping on the packets (e.g. inspecting the packet contents and/or descriptive data (e.g. metadata) about the packet) which are encoded by the WTD in the context of the encode-into-packet service provided by the WTD;

b. respectively classifying each eavesdropped packet as one of: (i) a packet encoding audio (i.e. audio-stream data); (ii) a packet encoding video (i.e. video-stream data); and (iii) a packet encoding non-media-stream data (NMSD—i.e. data other than audio-stream or media-stream data) such as text;

c. probing each of the candidate Wireless Internet-Access gateways (WIAGs) of a plurality of candidate Wireless Internet-Access gateways (WIAGs), to respectively measure a set of internet connective parameters for each candidate Internet gateway;

d. based on analysis of internet connectivity parameters, and in accordance with optimizing QOS (e.g. QOS on an absolute level or relative QOS), designating a first of the candidate WIAGs as NMSD-preferred, a second of the candidate WIAGs as audio-preferred, and a third of the candidate WIAGs as video-preferred, the first, second and third WIAGs being distinct from each other;

e. causing the wireless terminal device (WTD) to operate either in a first mode, a second mode or a third mode, one mode exclusively at a time, such that:

(i) when the wireless terminal device (WTD) is in the first mode, the wireless terminal device (WTD) is exclusively wirelessly connected to the NMS-preferred WIAG;

(ii) when the wireless terminal device (WTD) is in the first mode, the send-packet(s)-to-remote-destination service is partially overridden so as to: (A) block-and-cache outgoing packets that were classified as encoding audio; (B) block-and-cache outgoing packets that were classified as encoding video; and (C) allow outgoing packets that were classified as encoding non-media-stream (NMS) data to be wirelessly transmitted (e.g. along with remote routing instructions—i.e. an IP address of a remote destination), to the NMS preferred Internet gateway in the context of the send-packet(s)-to-remote-destination service (see "Service B" of FIG. 4);

(iii) when the wireless terminal device (WTD) is in the second mode, the wireless terminal device (WTD) is exclusively wirelessly connected to the audio-preferred WIAG;

(iv) when the wireless terminal device (WTD) is in the second mode, the send-packet(s)-to-remote-destination service is partially overridden so as to: (A) block-and-cache outgoing packets that were classified as encoding NMS data; (B) block-and-cache outgoing packets that were classified as encoding video; and (C) allow outgoing packets that were classified as encoding audio to be wirelessly transmitted (e.g. along with remote routing instructions—i.e. an IP address of a remote destination), to the audio preferred Internet gateway in the context of the send-packet(s)-to-remote-destination service (see "Service B" of FIG. 4);

(v) when the wireless terminal device (WTD) is in the third mode, the wireless terminal device (WTD) is exclusively wirelessly connected to the video-preferred WIAG; and (v) when the wireless terminal device (WTD) is in the third mode, the send-packet(s)-to-remote-destination service is partially overridden so as to: (A) block-and-cache outgoing packets that were classified as encoding NMS data; (B) block-and-cache outgoing packets that were classified as encoding audio; and (C) allow outgoing packets that were classified as encoding video to be wirelessly transmitted (e.g. along with remote routing instructions—i.e. an IP address of a remote destination), to the video preferred Internet gateway in the context of the send-packet(s)-to-remote-destination service (see "Service B" of FIG. 4), wherein the method further requires the wireless terminal device (WTD) to operate in each of the first, second and third modes, sequentially and one at a time, and wherein steps c and d are performed more than once to respectively change identifies of each of the NMS-preferred, audio-preferred and video-preferred WIAGs.

Figure 5:
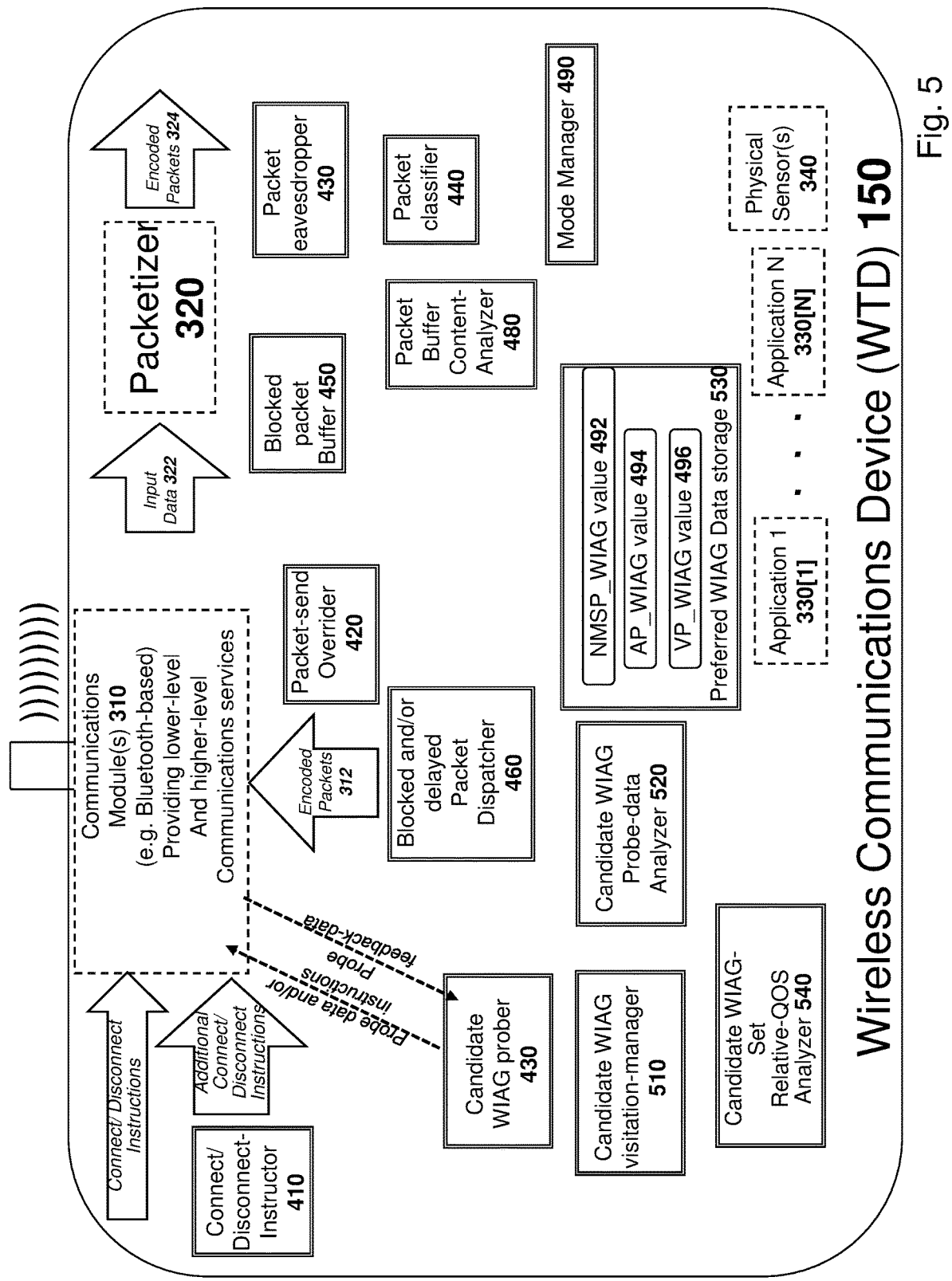
FIG. 5 shows a wireless terminal device (WTD) and elements thereof and/or in accordance with some embodiments of the invention.

A Discussion of FIG. 5

FIG. 5 shows a wireless terminal device (WTD) and elements thereof and/or in accordance with some embodiments of the invention.

Figure 4:
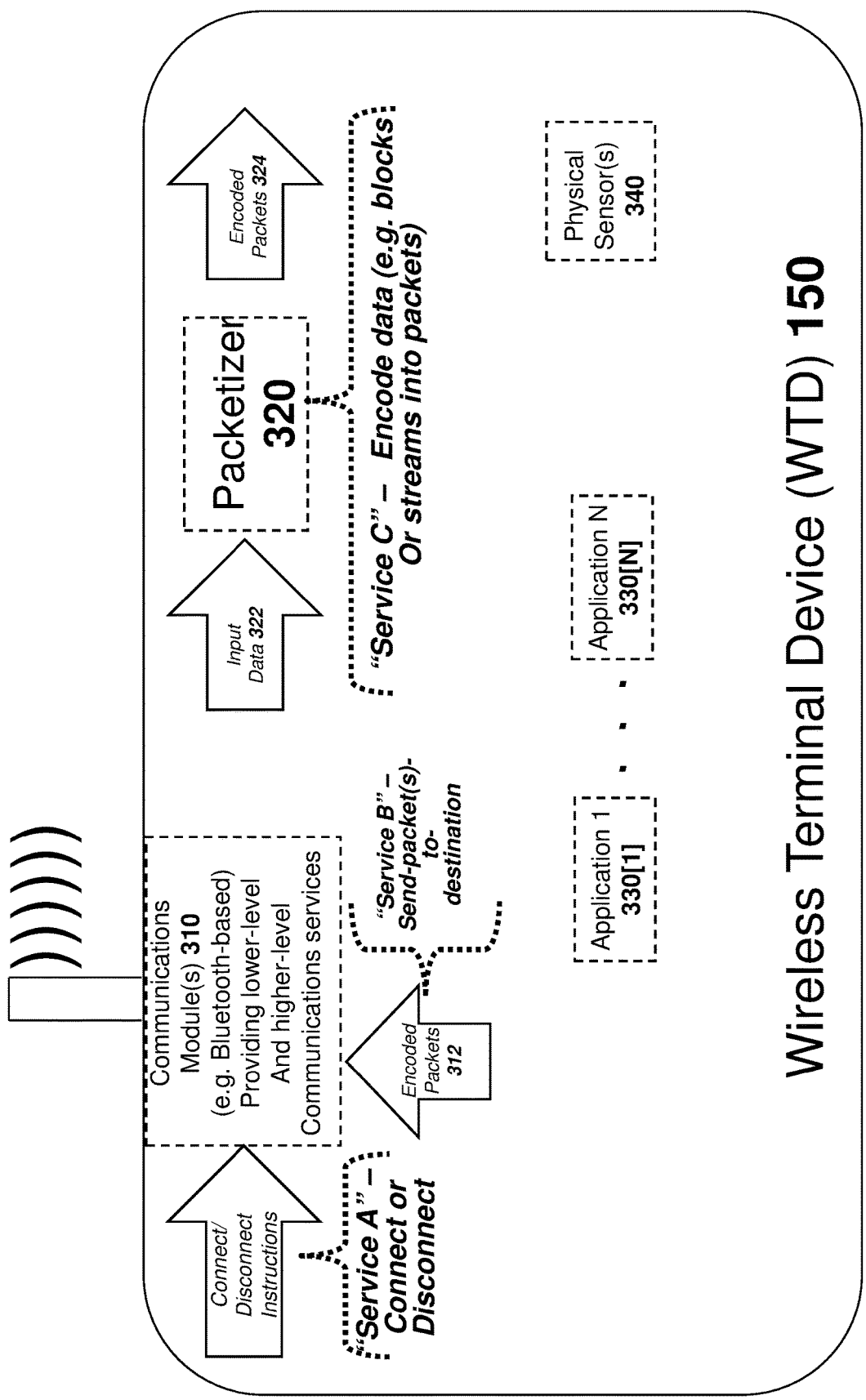
FIG. 4 shows a prior art wireless terminal device (WTD) and elements thereof and/or thereon.

In one non-limiting example, one or more (e.g. most or all) additional elements present in FIG. 5 but not present in FIG. 4 are installed as part of a software development kit (SDK)—e.g. allowable under iPhone® or Android® enviroments.

For example, FIG. 4 illustrated Service A, Service B and Service C. Element(s) of FIG. 5 may either: (i) feed input data to one or more of the services; and (ii) eavesdrop on (e.g. inspect) output of one of more of the services (e.g. inspect actual packets or properties thereof).

Any element of FIG. 5 may be implemented by any suitable combination of software, electronic circuitry (e.g. analog or digital circuitry—including but not limited to volatile or non-volatile memory, modems, microprocessors, CPU, GPU, FPGA) or firmware.

In addition to the elements of FIG. 4, FIG. 5 shows the following elements related to packet inspection and/or analysis:

(i) Packet eavesdropper 430—this may inspect content of and/or data about internet packets generated on WTD 150—e.g. inspect their the packet's content (e.g. for unencrypted packets) and/or data about the packets (e.g. their size, the time the packets are generated, header data, identifier data for each packet);

(ii) Packet classifier 440—it is possible to classify (e.g. on a per-packet-ID basis) packets (e.g. not necessarily ever packet ever generated on 150) as one of: A. packet derived from NMS data such as text; B. packet derived from audio; C. packet derived from video. This may be performed, e.g. according to one or more of an identify of the application which generated the packet (e.g. a camera app which would generate video), a CPU usage at the time the packets was generated (e.g. if a camera app uses a lot of CPU, this is likely to be the culprit), packet size, packet content (e.g. for unencrypted data). For example, a data structure such a table mapping packet identifier and packet type may be stored on 150 (e.g. in volatile and/or non-volatile memory thereof).

Elements of FIG. 5 Related to Operating Modes—Stored Identifiers of WIAGs and Determining and/or Updating Identifiers of WIAGs In embodiments of the invention, the WTD may provide 3 operating modes:

(i) A first operating mode for sending NMS packets (e.g. only NMS-classified packets are permitted to be wirelessly sent and/or the sending of non-NMS-classified packets are intentionally delayed);

(ii) A second operating mode for sending audio packets (e.g. only audio-classified packets are permitted to be wirelessly sent and/or the sending of non-audio-classified packets are intentionally delayed);

(iii) A third operating mode for sending video packets (e.g. only video-classified packets are permitted to be wirelessly sent and/or the sending of non-video-classified packets are intentionally delayed);

Towards this end, a record may be kept of the "preferred" WIAG 100 for the first, second and third modes—for example, in preferred WIAD data storage 530 (e.g. volatile and/or non-volatile memory) showing: (i) NMSP_WIAG value 492—e.g. the value may be the identifier (e.g. IP address or in any other form) of the WIAG 100 which is 'preferred' for operating when in the first mode (NMSP is an abbreviation of non-media-stream preferred); (ii) AP_WIAG value 494—e.g. the identifier (e.g. IP address or in any other form) of the WIAG 100 which is 'preferred' for operating when in the second mode (AP is an abbreviation of audio preferred); and (iii) VP_WIAG value 496—e.g. the identifier (e.g. IP address or in any other form) of the WIAG 100 which is 'preferred' for operating when in the third mode (VP is an abbreviation of video preferred).

These values may be updated over time—e.g. the QOS or related abilities of WIAGs in communication with WTD 150 may change, various WIAGs may go on or off-line, etc.

In order to compute or update NMSP_WIAG value 492 and/or AP_WIAG value 494 and/or AP_WIAG value 494, one or more of the following elements may be used:

(i) Candidate WIAG prober 430—e.g. instructing 310 to connect to (and then disconnect from) different candidate WIAGs—e.g. for the purpose of measuring QOS-related parameters—e.g. this may include connect/disconnect instructions, identifier (e.g. IP address) of different candidate WIAGs, and the like. Candidate WIAG prober may also send out probe data—e.g. a 'ping' or 'jitterbuffer' or "traceroute" command or request—e.g. via 310;

(ii) Candidate WIAGs visitation-manager 540—e.g. a list (or other data structure) of various candidate WIAGs may be kept (e.g. along with probe data and/or elapsed time since each WIAG was 'visited.'—for the present disclosure, to 'visit' WIAG is to connect thereto and to probe it (e.g. obtain internet connectivity data therefrom). Candidate WIAGs visitation-manager 540 may decide which candidate WIAG to visit next, or may generate a command to interrupt transmission of audio and/or video and/or NMS originated packets for the purposes of probing (e.g. disconnecting from the current WIAG and connecting to a new one) a candidate WIAG;

(iii) Candidate WIAS-Set relative-0QOS analyzer 540—based on the probing data, the QOS (absolute QOS or 'specific-function-related' QOS—(A)_ the relative ability for transmitting NMS relative to audio and/or video and/or (B) the relative ability for transmitting audio relative to NMR and/or video; and/or (C) the relative ability for transmitting video relative to NMS and/or audio.

For example, in accordance with the output of 540, the contents of preferred WIAD data storage 530 may be updated. For example, if probing data indicated that a specific candidate WIAG is more suitable for NMS than the current preferred NSM-specific WIAG (i.e. whose value is in 492) then the value of 492 may be updated. Similar for 492 or 494.

Elements of FIG. 5 Related to Enforcing Operating Modes

Embodiments of the present invention relate methods for selectively blocking and/or delaying packets of the 'wrong type' that does not match a current mode (e.g. stored in 530) while allowing packets of the 'right type' to be wirelessly transmitted outside of WTD 150.

Wrong type (not matching current mode)—if we are in the first mode, audio and video packets are the wrong type. If we are in the second mode, NMR and video packets are the wrong type. If we are in the third mode, NMS and audio packets are the wrong type.

Right type (matching current mode)—if we are in the first mode, NMS packets are the right type. If we are in the second mode, audio packets are the right type. If we are in the third mode, video packets are the right type.

In non-limiting embodiments, one or more of (any combination of) the following elements are provided:

(i) Packet-send overrider 420. For example, to delay the sending of packets which otherwise would have been sent (e.g. wrong type packets which do not match the current mode). In one non-limiting example, the operating system may maintain a queue with packet ID and timestamp and transmit packets on a FIFO basis. In some embodiments, Packet-send overrider 420 accesses OS data structure to 'incorrectly' change a timestamp (e.g. to change the value to a time in the future) to cause the OS to not transmit a blocked packet. Subsequently, if there is a need to transmit the blocked packet (e.g. after a mode-transition), it is possible to again change the timestamp of the previously-blocked packet;

(ii) Blocked and/or packet buffer 450—may be part of the OS's packet buffer or a separate buffer in any combination of volatile and/or non-volatile memory. May also include a list of blocked packets and their clarification type;

(iii) Packet-buffer content analyzer 480—e.g. in some embodiments, the backlog of blocked packets may be analyzed—e.g. on a per-packet-type basis—e.g. the number and/or size and/or type of blocked packets. For example, it may be possible to perform a mode-transition according to the contents of the blocked-packet buffer 450—e.g. if the ratio of the aggregate size of blocked video packets to the ratio of the aggregate size of blocked audio packets increases or exceeds a threshold, this may trigger a transition from the third to the second mode;

(iv) Blocked and/or delayed packet dispatcher 460—to cause previously blocked packets to now be transmitted from the WTD 150. For example, an audio packet blocked when WTD 150 was in the third mode, gets unblocked/dispatched upon transitioning into the second mode. E.g. the time-stamp of an OS packet-queue might be updated from a 'future time' to a current time, causing the OS to transmitted it.

(v) (e.g. NMS-send vs. Audio-send vs. Video-send) Mode Manager 490—for causing the WTD 150 to stay in a current mode and/or instructing a mode-transition For the present disclosure, "blocking a packet" while the WTD is in a particular 'current' mode means preventing the packet from being transmitted out of the WTD as long as the WTD remains in that particular 'current' mode and as long it there is no mode transition out of that particular 'current' mode.

The term "caching" in the context of "blocking and caching" does not require the element to be "explicitly" stored (e.g. copied) in any particular storage though this is one possibility. Thus, we note that the term 'caching" of "blocking and caching" means ensuring that the packet stays stored (e.g. even in a "pre-existing" volatile and/or non-volatile storage used by the OS and/or in an OS data structure) until a later time when the packet is eventually (i.e. after mode-transition out of the current mode) wirelessly transmitted from the WTD.

An "outgoing packet" is any packet which explicitly or implicitly is designated to be transmitted out of the WTD.

Additional Element→

Connect/disconnect instructor 410—may be used, by visitation manager 510 and/or by mode-manager 490 to instruct WTD 150 to connect to or disconnect from a WIAG 100.

Figure 6:
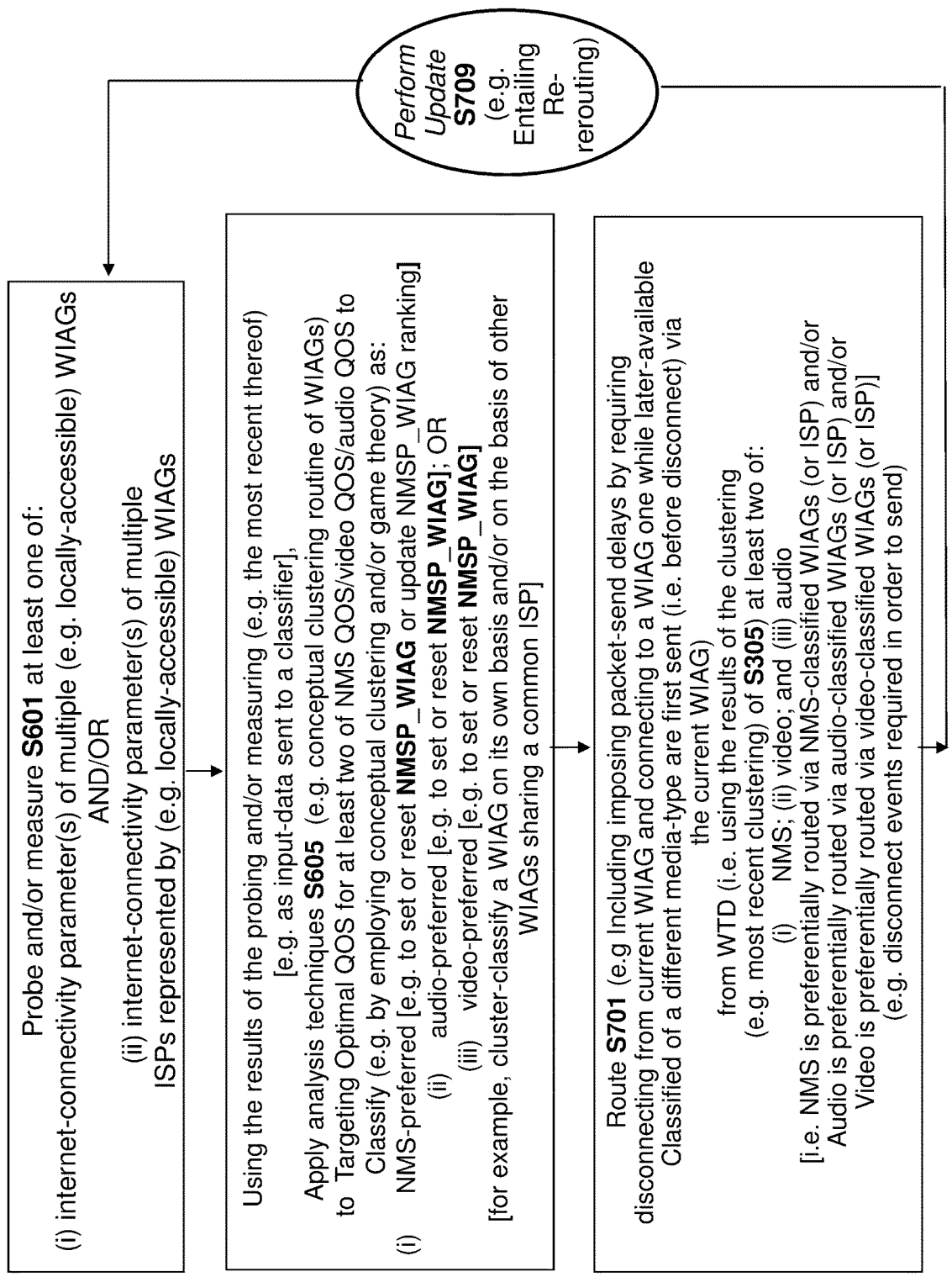
FIGS. 6, 7A-7B, 8A-8C, 9, 10 show flow charts according to different embodiments.
Figure 7A:
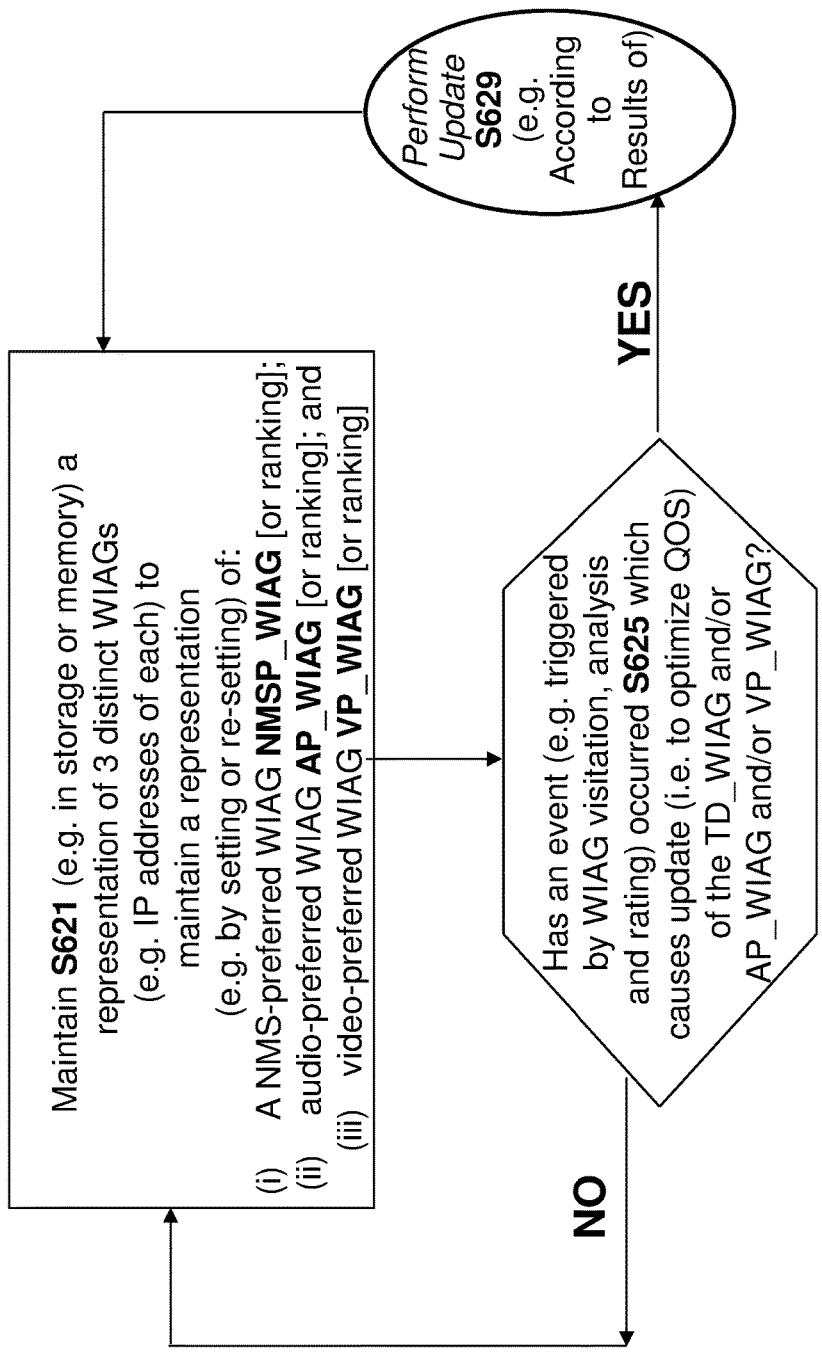
Figure 7B:
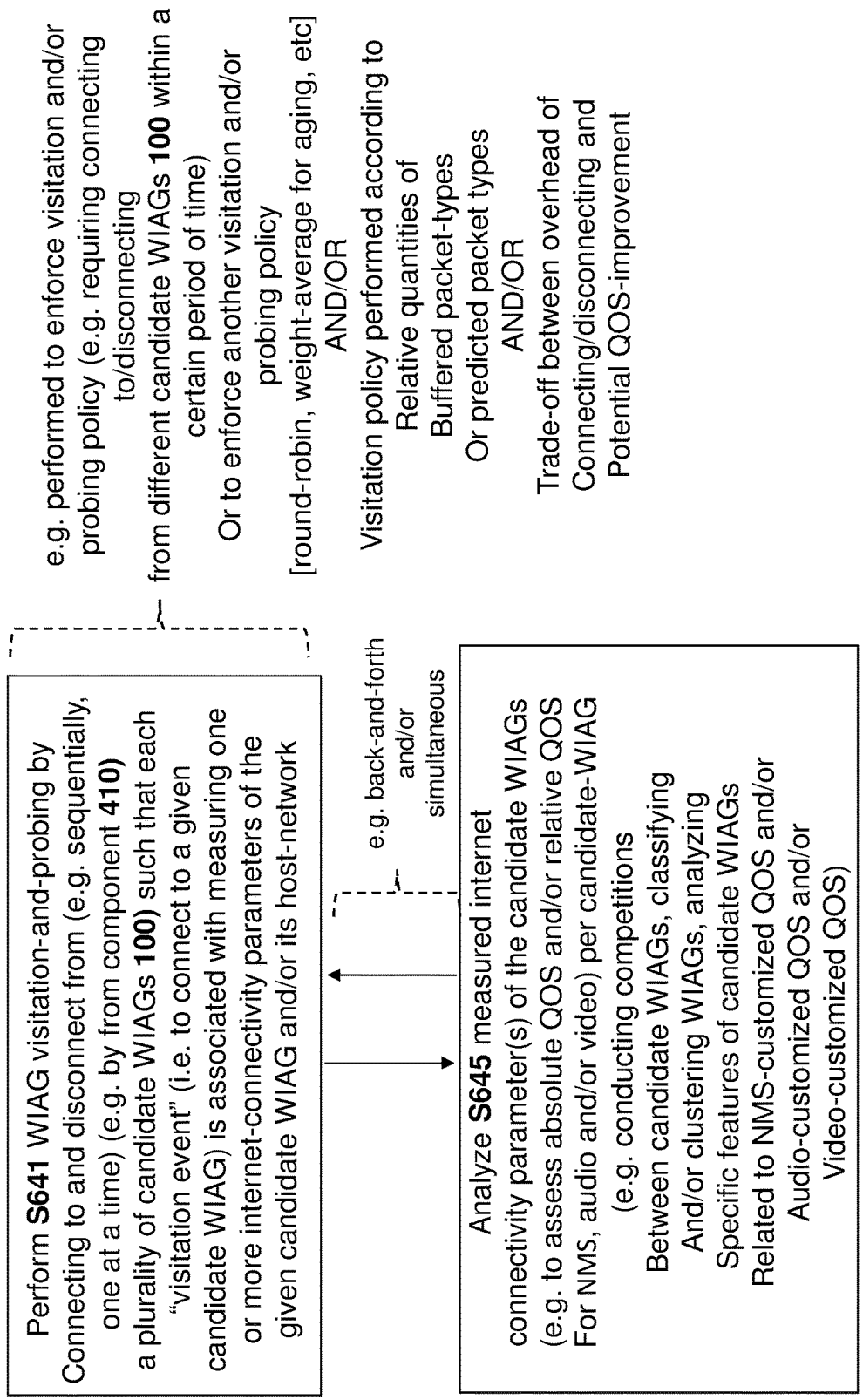

A Discussion of FIGS. 6, 7A-7B

As stated above, and without limitation, embodiments of the invention may relate to situations (e.g. emergency situations) where despite the overhead (and anticipated reduction of QOS) of switching between WIAGs, it may be optimal to switch there-between in the specific manner as disclosed herein.

According to embodiments of the invention, instead of relying only on a 'static connection' to the internet via a pre-set WIAG (as is done in the prior art today and is ubiquitous), it is possible to repeatedly to:

I. repeatedly "poll" and/or measure properties of a plurality of WIAGs to measure performance and/or Internet connectivity parameters of each WIAG (and/or of associated ISPs) (see step S601 of FIG. 6)—this may be performed by any combination of FIG. 5 elements 410, 510, 430;

II. based on the results of the polling and/or measuring, score (e.g. by element 540) each of the plurality of WIAGs based on their predicted ability to successfully carry Internet communications and/or specify types of communications (e.g. score on a per-type basis—where every given WIAG's respective suitability for NMS, video streaming and audio streaming are each respectively scored) (e.g. see step S605);

III. based on the scoring and/or clustering and/or rating, route packets via different content-specific (e.g. NMS vs. audio vs. video)—the routing may be enforced by the modes and mode-transitions therebetween (e.g. see step S701 of FIG. 6)—e.g. performed by 440, 460, 480 and/or 490).

FIGS. 7A-7B showing steps S621, S625, S629, S641, S645 are related methods e.g. for obtaining data for determining an operating mode.

The content of e.g. 530 may be update in step S709 of FIG. 6 or step S629 of FIG. 7A.

The 'switching of WIAG' and/or re-rerouting may be done based on scoring of WIAG 100 and/or classification of an WIAG as most suitable for NMS or video stream or audio stream (e.g. responsively in response to update scoring and/or classifying. Input data for scoring and/or classifying and/or clustering WIAGs (e.g. see step S605 of FIG. 6 and element 540 of FIG. 5)—

(I) Ping—it is possible to maintain a database of known target IP addresses (e.g. the IP address of www.nytimes.com, the IP address of www.whitehouse.gov, etc) which have significance. For each target IP address, a ping value between a 'polled and/or measured WIAG," a latency (i.e. in milliseconds) is stored (e.g. in a table). A lower latency might increase a WIAG's "suitability score" for connecting the Internet. This may be periodically updated.

(II) traceroute or tracert—once again, using a database of known target IP addresses. The result may be periodically updated. In contrast to Ping which uses a smaller payload and is "optimized' for measuring latency than bandwidth, traceroute or tracert may provide other metrics—e.g. number of hops, sending data via 'known good routers' or 'known bad routers and the like.

(III) Jiiter buffer measurement—this is measurement of the ability of the WIAG and/or the hubs and/or nodes along a route between the WIAG and a remote device to maintain packet order. A higher score is assigned to WIAGs that are more capable to maintain packet order.

In one example, audio content (rather video content) is 'greedily' assigned to WIAGs having the best jitter buffer packet-order-retaining ability.

In another example, text content is 'greedily' assigned to WIAGs having the lowest ping value—i.e. low latency maty be premium, and bandwidth is less important.

Instead of (or in addition to) scoring and/or ranking WIAGs, it is possible to cluster (e.g. using a cobweb clustering technique) and/or classify WAIDs based on their suitability for NMS (where latency may be at a premium and bandwidth or sustainability less important), vs. suitability for audio (which may put a premium on the ability to retain packet order—more so than video where various algorithms for reordering and/or interpolating may be available) vs. suitability for video.

In some embodiments, Nash (or other game theory) techniques may be employed to select between competing design considerations (i.e. for M<S vs. video stream vs. audio stream).

Another Discussion of Enforcing

Figure 8A:
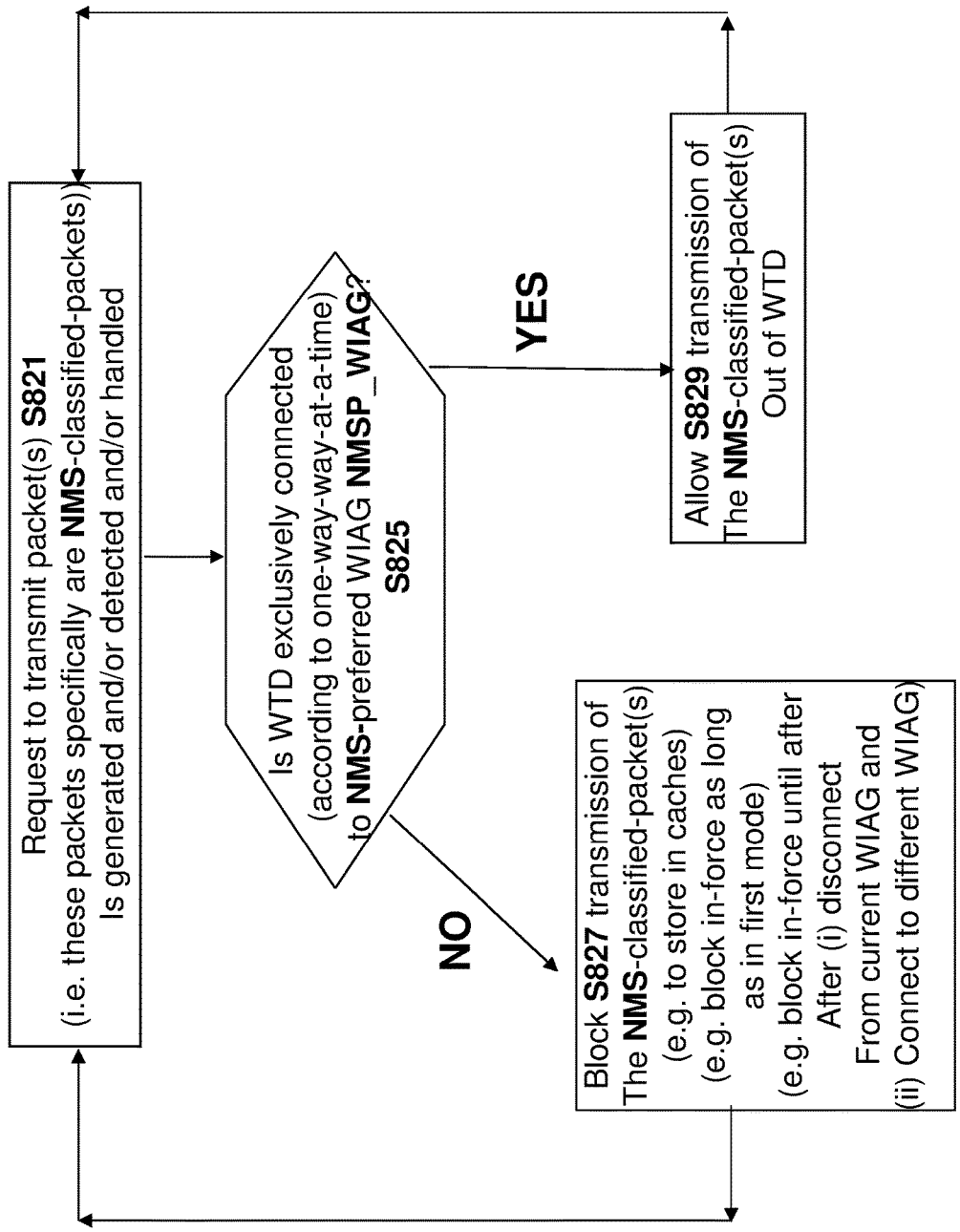

FIG. 8A shows a method including steps S821, S825, S827 and S829 for enforcing the first mode.

Figure 8B:
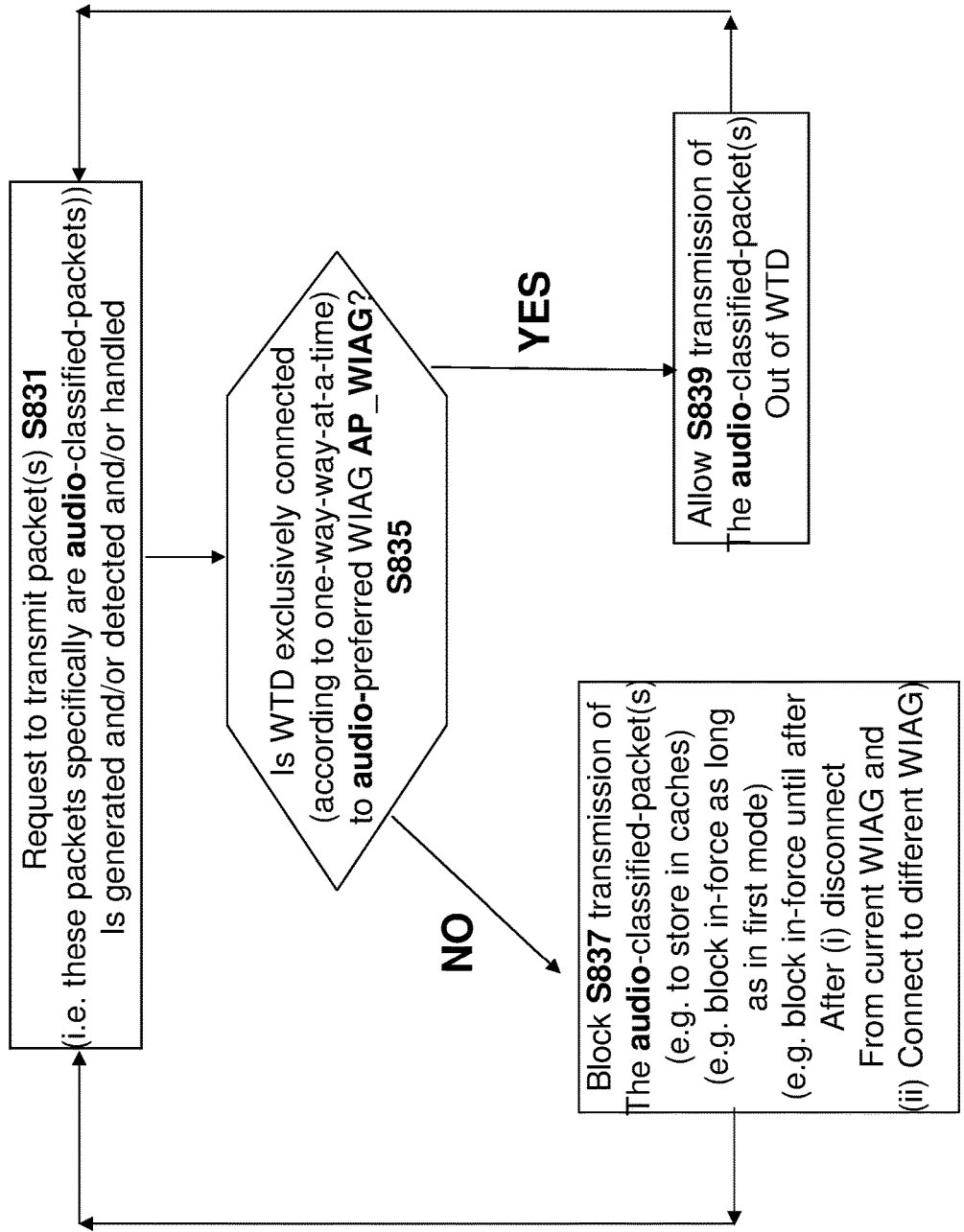

FIG. 8B shows a method including steps S821, S825, S827 and S829 for enforcing the second mode.

Figure 8C:
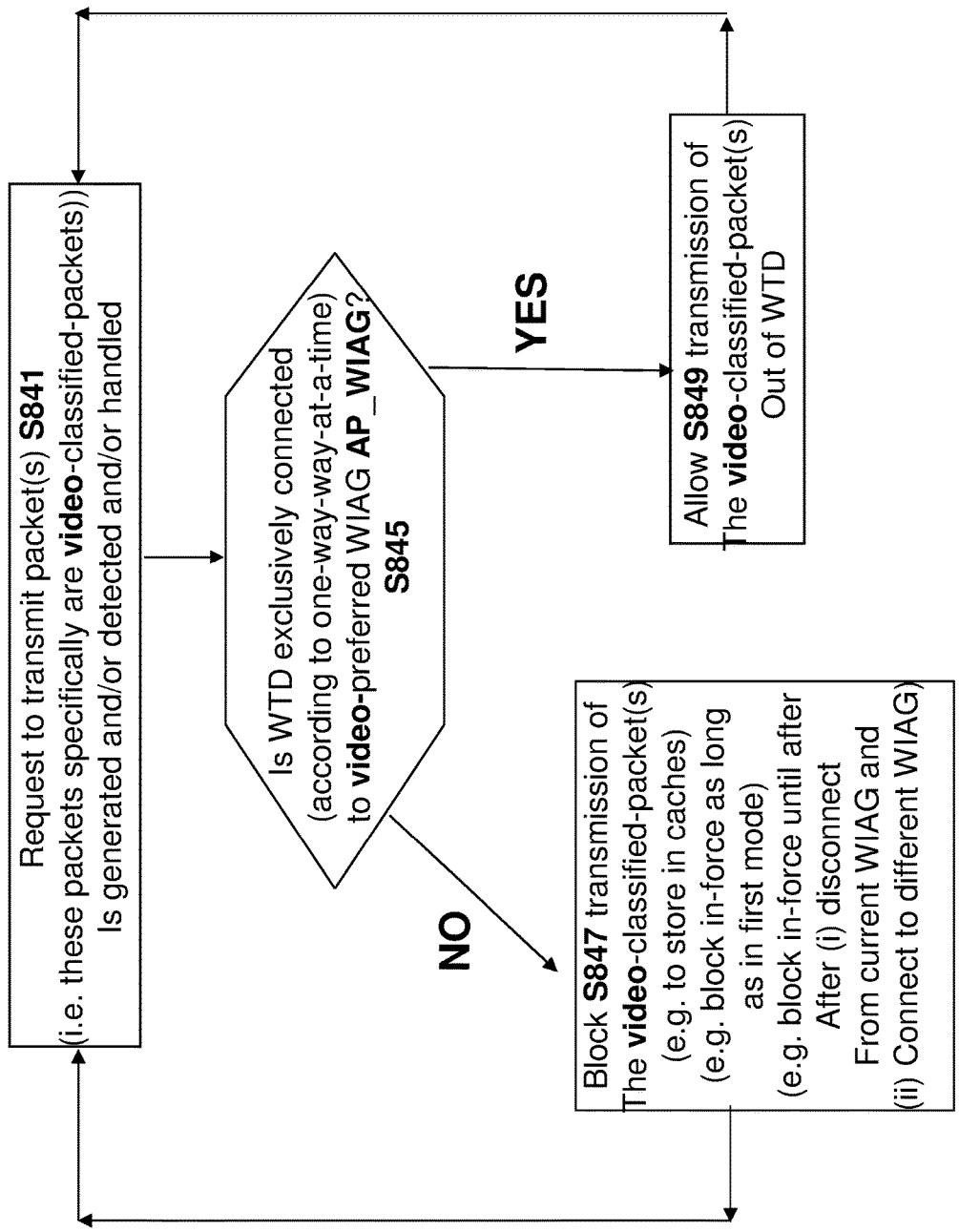

FIG. 8C shows a method including steps S821, S825, S827 and S829 for enforcing the third mode.

Mode-Transitioning

Figure 9:
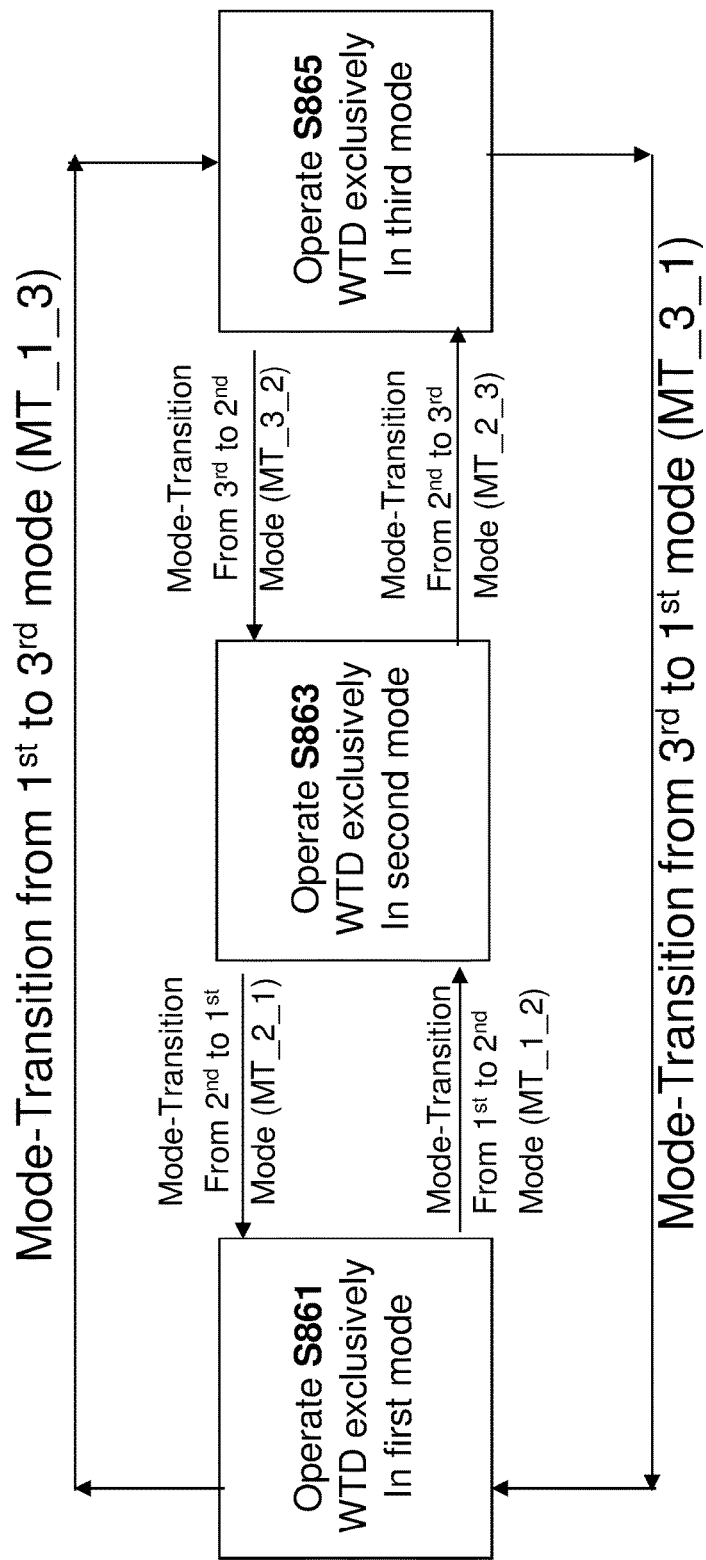

FIG. 9 showing steps S861, S863, and S865 relate to operating in the different modes and transitions therebetween.

Figure 10:
Figure 12:
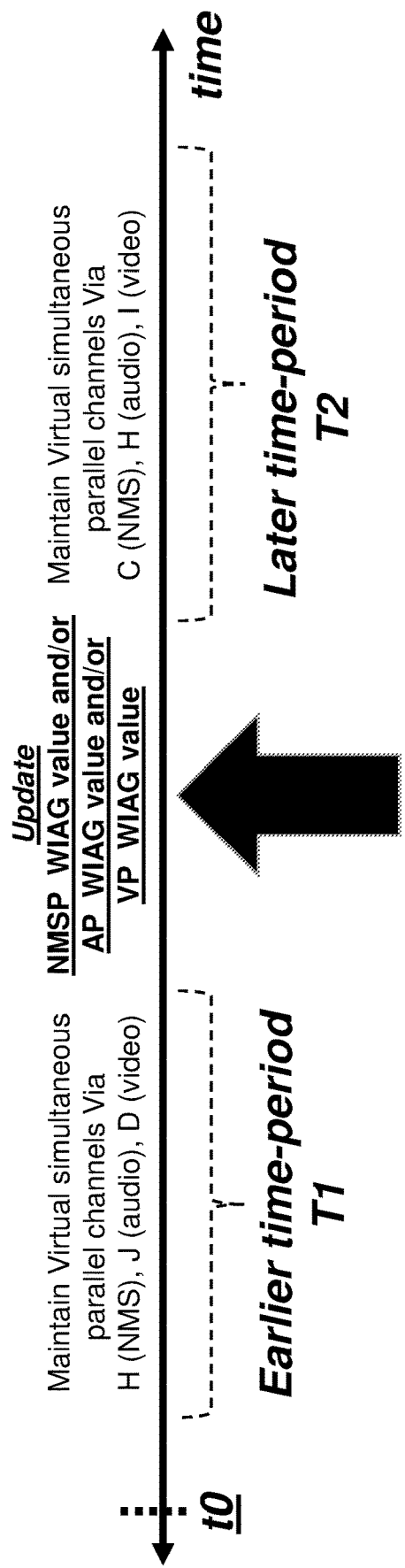
FIGS. 12, 13A and 14A are timelines according to example embodiments.
Figure 13A:
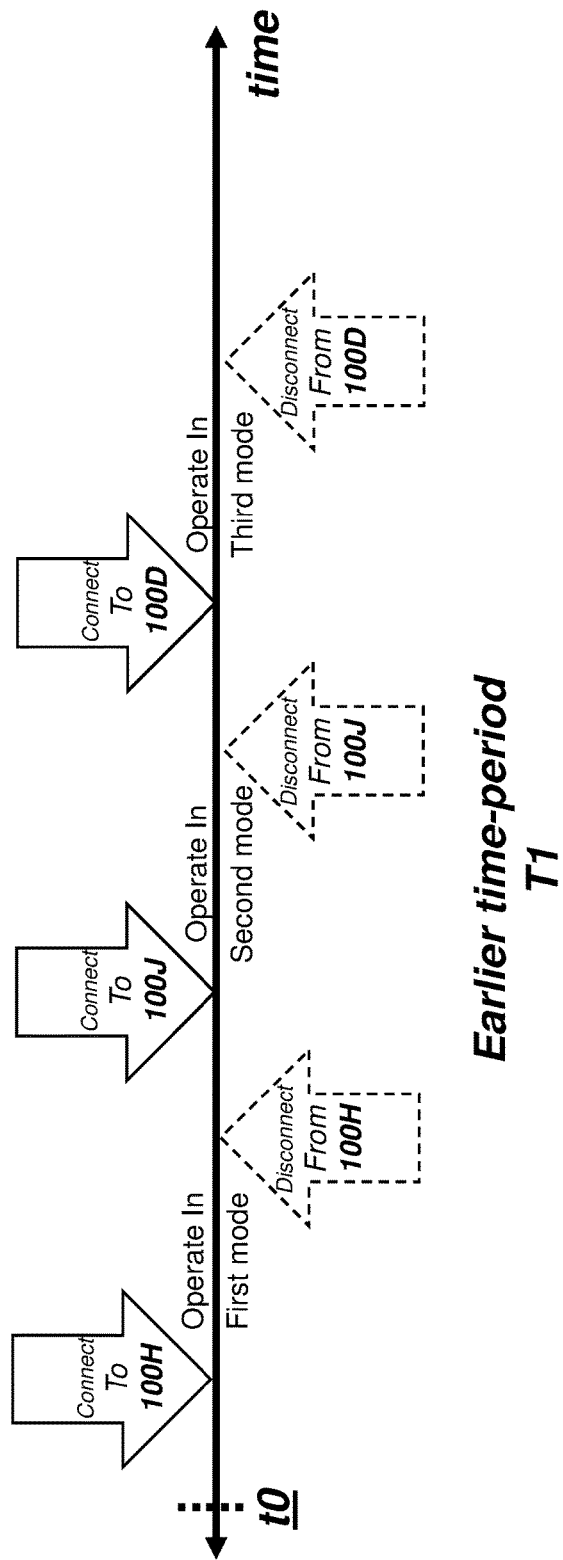
Figure 13B:
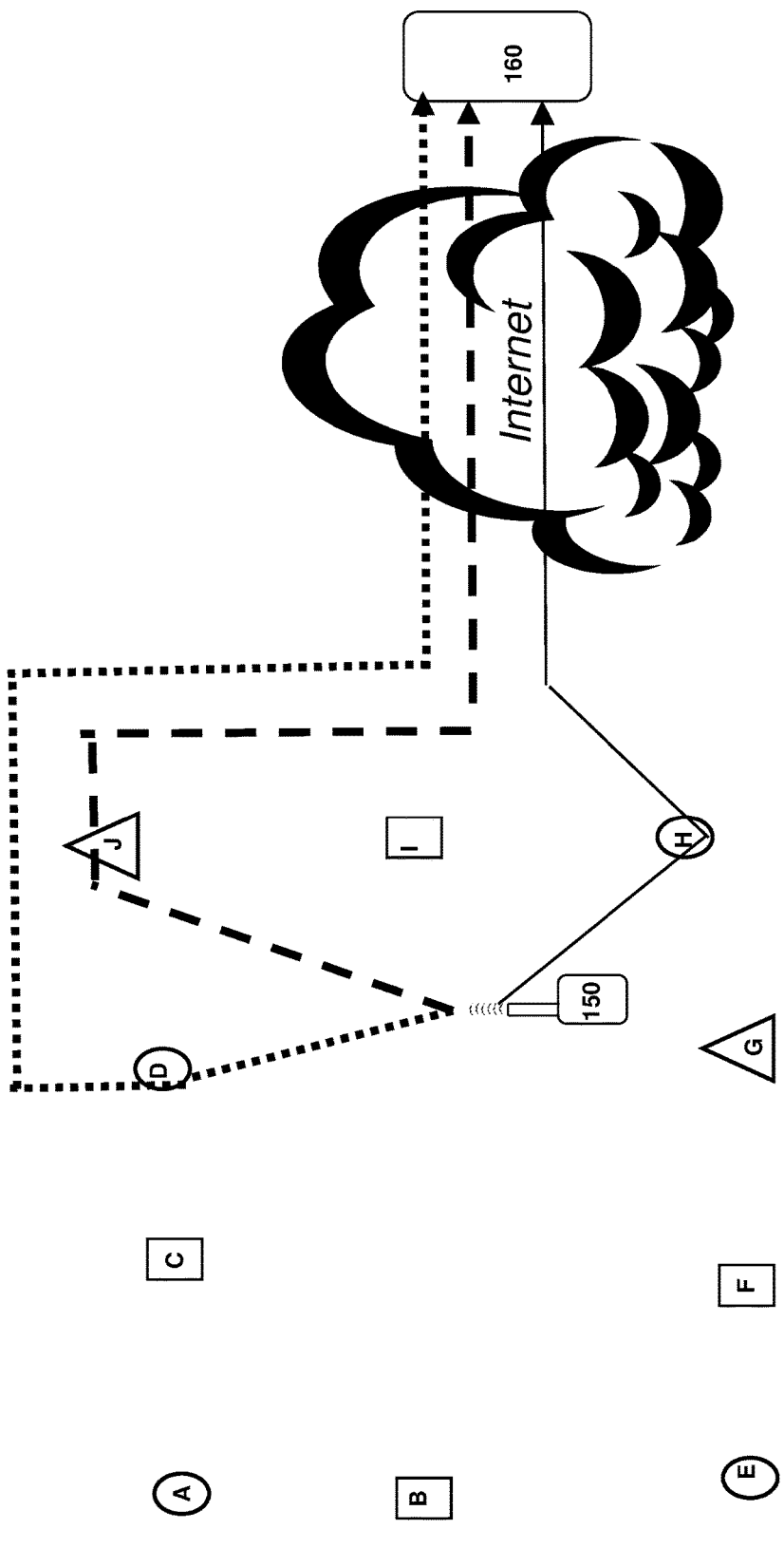
FIGS. 13B and 14B are example block diagrams.
Figure 14A:
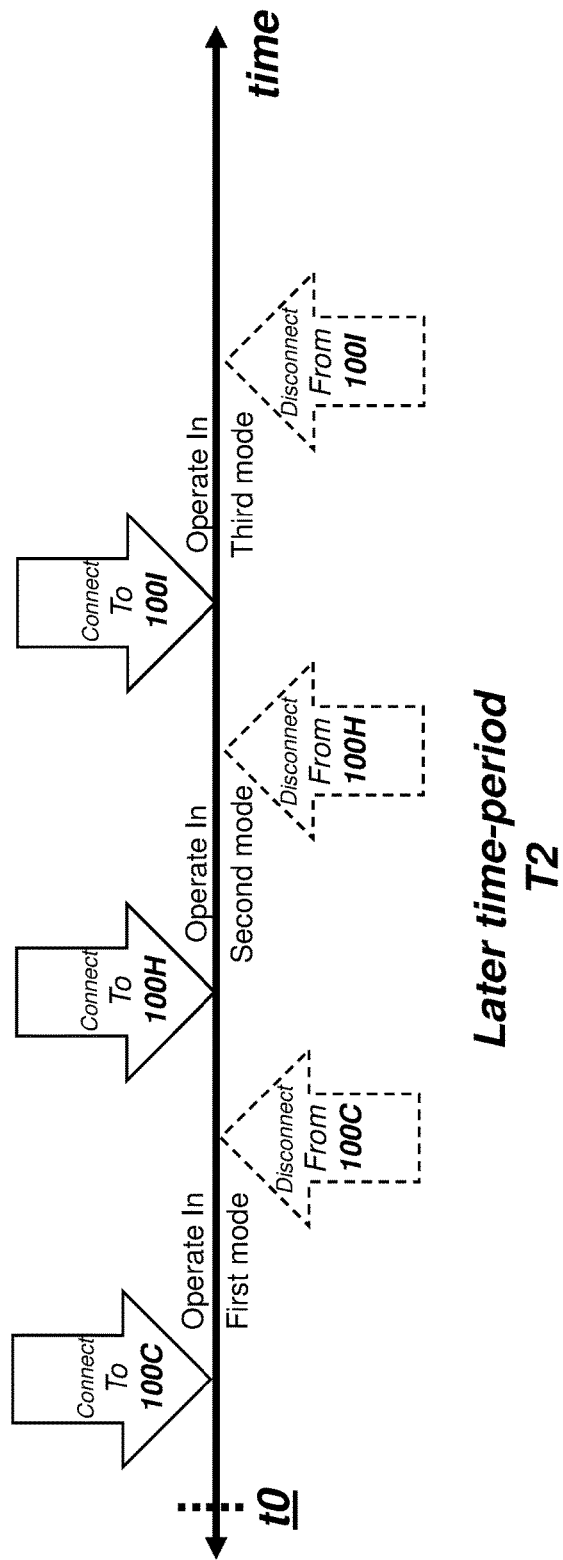
Figure 14B:
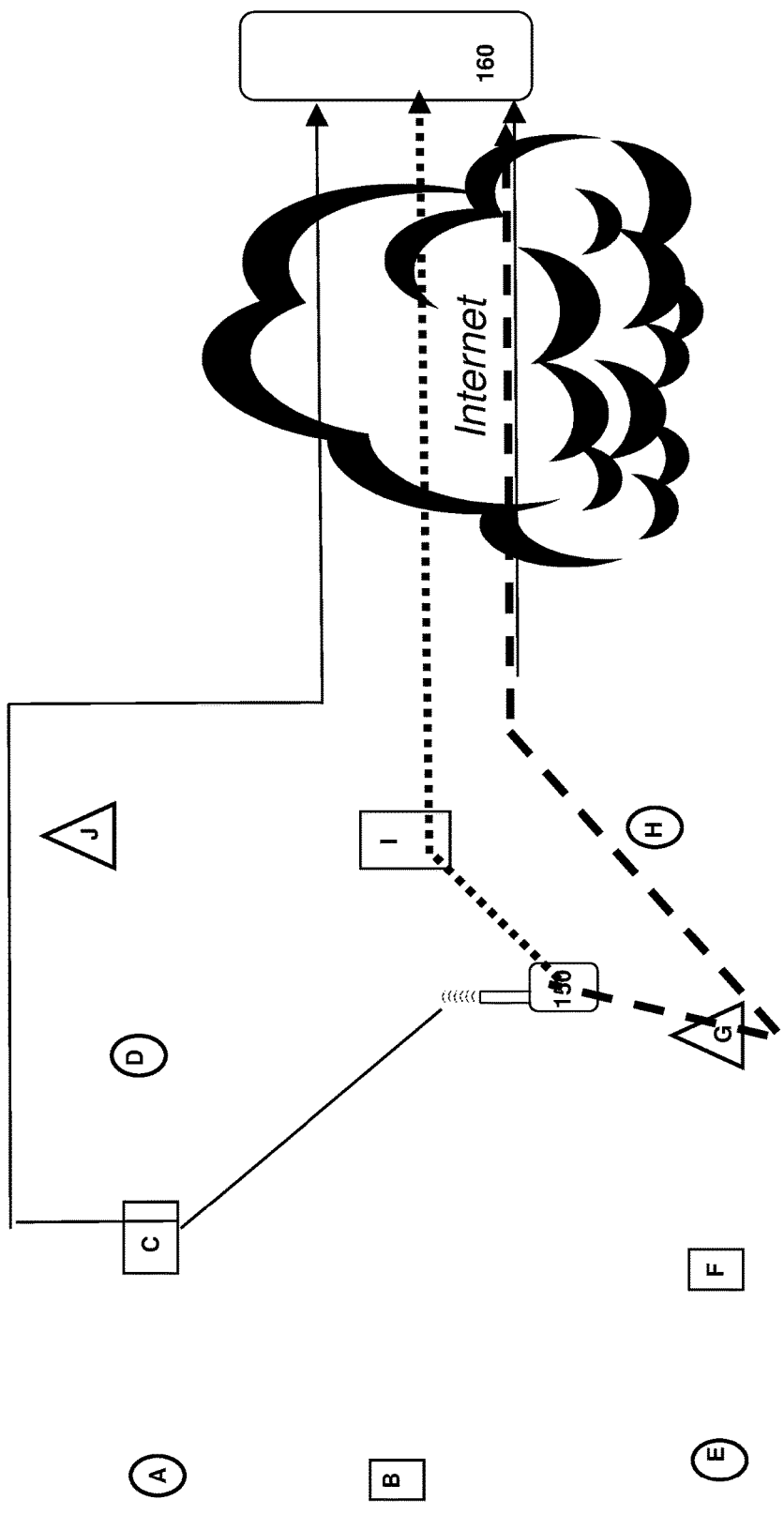

As shown in FIGS. 10 (including steps S871 and S875) and 11B, mode transitions can be performed—e.g. in response to different triggers.

FIGS. 12, 13A-13B and 14A-14B show different examples—e.g. at least one example related to maintaining virtual simultaneous channels.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of operating a wireless terminal device (WTD) which enforces an "at most one Internet Gateway at a time policy" such that the WTD is wirelessly connected to at most one Wireless Internet-Access gateway at a time, terminal device (WTD) is configured to provide at least the following onboard device-services: (i) an encode-into-packet service; and (ii) a send-packet(s)-to-remote-destination service, the wireless terminal device (WTD) being disposed for wireless communication with a plurality of candidate Wireless Internet-Access gateways (WIAGs), the method comprising:

a. eavesdropping on the packets which are encoded by the WTD in the context of the encode-into-packet service provided by the WTD;

b. respectively classifying each eavesdropped packet as one of: (i) a packet encoding audio; (ii) a packet encoding video; and (iii) a packet encoding non-media-stream (NMS) data;
c. probing each of the candidate Wireless Internet-Access gateways (WIAGs) of a plurality of candidate Wireless Internet-Access gateways (WIAGs), to respectively measure a set of internet connective parameters for each candidate Internet gateway;
d. based on analysis of internet connectivity parameters, and in accordance with optimizing QOS, designating a first of the candidate WIAGs as NMS-preferred, a second of the candidate WIAGs as audio-preferred, and a third of the candidate WIAGs as video-preferred, the first, second and third WIAGs being distinct from each other;
e. causing the wireless terminal device (WTD) to operate either in a first mode, a second mode or a third mode, one mode exclusively at a time, such that:
 (i) when the wireless terminal device (WTD) is in the first mode, the wireless terminal device (WTD) is exclusively wirelessly connected to the NMS-preferred WIAG;
 (ii) when the wireless terminal device (WTD) is in the first mode, the send-packet(s)-to-remote-destination service is partially overridden so as to: (A) block-and-cache outgoing packets that were classified as encoding audio; (B) block-and-cache outgoing packets that were classified as encoding video; and (C) allow outgoing packets that were classified as encoding non-media-stream (NMS) data to be wirelessly transmitted, to the NMS preferred WIAG in the context of the send-packet(s)-to-remote-destination service;
 (iii) when the wireless terminal device (WTD) is in the second mode, the wireless terminal device (WTD) is exclusively wirelessly connected to the audio-preferred WIAG;
 (iv) when the wireless terminal device (WTD) is in the second mode, the send-packet(s)-to-remote-destination service is partially overridden so as to: (A) block-and-cache outgoing packets that were classified as encoding NMS data; (B) block-and-cache outgoing packets that were classified as encoding video; and (C) allow outgoing packets that were classified as encoding audio to be wirelessly transmitted, to the audio preferred WIAG in the context of the send-packet(s)-to-remote-destination service;
 (v) when the wireless terminal device (WTD) is in the third mode, the wireless terminal device (WTD) is exclusively wirelessly connected to the video-preferred WIAG; and
 (v) when the wireless terminal device (WTD) is in the third mode, the send-packet(s)-to-remote-destination service is partially overridden so as to: (A) block-and-cache outgoing packets that were classified as encoding NMS data; (B) block-and-cache outgoing packets that were classified as encoding audio; and (C) allow outgoing packets that were classified as encoding video to be wirelessly transmitted, to the video preferred WIAG gateway in the context of the send-packet(s)-to-remote-destination service,
wherein the method further requires the wireless terminal device (WTD) to operate in each of the first, second and third modes, sequentially in any order and one at a time, and wherein steps c and d are performed multiple times so that an identity of the NMS-preferred WIAG is changed at least once, an identity of the audio-preferred WIAG is changed at least once, and an identity of the video-preferred WIAG is changed at least once.

2. The method of claim 1 wherein a mode-set is defined as {first mode, second mode, third mode} and every transition from one member of the mode-set to another member of the mode-set requires disconnecting from an earlier-time WIAG and subsequently connecting to a later-time WIAG, and wherein: (i) if the transition is away from the first mode the earlier-time WIAG is the NSM-preferred WIAG, (ii) if the transition is away from the second mode the earlier-time WIAG is the audio-preferred WIAG, (iii) if the transition is away from the third mode the earlier-time WIAG is the video-preferred WIAG, (iv) if the transition is into the first mode the later-time WIAG is the NSM-preferred WIAG, (v) if the transition is into the second mode the later-time WIAG is the audio-preferred WIAG, (vi) if the transition is into the third mode the later-time WIAG is the video-preferred WIAG.

3. The method of claim 1 performed so that, during a period of time when the WTD is operating in a given mode selected from the group consisting of the first mode, the second mode and the third mode, the WTD operates such that:
 A. newer internet packets of a media-type which matches the given mode are transmitted out of the WTD before older internet packets of a media-type which does not match the given mode, and
 B. the older internet packets are held until the WTD transitions out of the given mode.

4. The method of claim 1 wherein one Internet connectivity parameters is "ping" which is used to measure latency, and a lower ping value increases a relative suitability of a candidate WIAG as NMS-preferred relative to a suitability of the candidate WIAG as audio or video-preferred.

5. The method of claim 1 wherein one Internet connectivity parameters is "jitterbuffer" which is used to measure the ability to retain order of remotely-transmitted power, and a better packet-order-retaining ability a relative suitability of a candidate WIAG as audio-preferred relative to a suitability of the candidate WIAG as NMS or video-preferred.

6. The method of claim 1 wherein the classified packets are unencrypted wherein and content of the unencrypted and classified packets is inspected as an input to the classifying.

7. The method of claim 1 wherein the classified packets are encrypted, and wherein content of the encrypted and classified packets is not inspected as an input to the classifying.

8. The method of claim 1 wherein all of the first, second and third modes are multicast modes where packets transmitted from the WTD while in the first or second or third modes are multi-cast transmitted, the method further comprising:
 prior to performance of step (e), operating the WTD in a prior mode that is (i) not a multi-cast mode and (ii) not the first mode and (iii) not the second mode and (iv) not the third mode.

9. The method of claim 8 wherein, an exiting of the prior mode to transition therefrom into the first or second or third mode is contingent upon a QOS-parameter of the WTD while in the prior mode being below a threshold level.

10. The method of claim 9 wherein the exiting of the prior mode so as to transition therefrom into the first or second or third mode is contingent upon detection of WIAG disconnect event that occurs while in the prior mode.

11. The method of claim 9 wherein the exiting of the prior mode so as to transition therefrom into the first or second or third mode is contingent upon a QOS-parameter of the WTD while in the prior mode being below a threshold level.

12. A wireless terminal device (WTD) configured to enforce an "at most one Internet Gateway at a time policy" such that the WTD is wirelessly connected to at most one Wireless Internet-Access gateway at a time, terminal device (WTD) is configured to provide at least the following onboard device-services: (i) an encode-into-packet service; and (ii) a send-packet(s)-to-remote-destination service, the wireless terminal device (WTD) being disposed for wireless communication with a plurality of candidate Wireless Internet-Access gateways (WIAGs), the WTD comprising:

a processor; and a non-transitory computer readable storage medium for instructions execution by the processor, the non-transitory computer readable storage medium having stored:

a. instructions, that when executed by the processor, eavesdrop on the packets which are encoded by the WTD in the context of the encode-into-packet service provided by the WTD;

b. instructions, that when executed by the processor, respectively classify each eavesdropped packet as one of: (i) a packet encoding audio; (ii) a packet encoding video; and (iii) a packet encoding non-media-stream (NMS) data;

c. instructions, that when executed by the processor, probe each of the candidate Wireless Internet-Access gateways (WIAGs) of a plurality of candidate Wireless Internet-Access gateways (WIAGs), to respectively measure a set of internet connective parameters for each candidate Internet gateway;

d. instructions, that when executed by the processor, designate, based on analysis of internet connectivity parameters, and in accordance with optimizing QOS, a first of the candidate WIAGs as NMS-preferred, a second of the candidate WIAGs as audio-preferred, and a third of the candidate WIAGs as video-preferred, the first, second and third WIAGs being distinct from each other;

e. instructions, that when executed by the processor, cause the wireless terminal device (WTD) to operate either in a first mode, a second mode or a third mode, one mode exclusively at a time, such that:

(i) when the wireless terminal device (WTD) is in the first mode, the wireless terminal device (WTD) is exclusively wirelessly connected to the NMS-preferred WIAG;

(ii) when the wireless terminal device (WTD) is in the first mode, the send-packet(s)-to-remote-destination service is partially overridden so as to: (A) block-and-cache outgoing packets that were classified as encoding audio; (B) block-and-cache outgoing packets that were classified as encoding video; and (C) allow outgoing packets that were classified as encoding non-media-stream (NMS) data to be wirelessly transmitted, to the NMS preferred WIAG in the context of the send-packet(s)-to-remote-destination service;

(iii) when the wireless terminal device (WTD) is in the second mode, the wireless terminal device (WTD) is exclusively wirelessly connected to the audio-preferred WIAG;

(iv) when the wireless terminal device (WTD) is in the second mode, the send-packet(s)-to-remote-destination service is partially overridden so as to: (A) block-and-cache outgoing packets that were classified as encoding NMS data; (B) block-and-cache outgoing packets that were classified as encoding video; and (C) allow outgoing packets that were classified as encoding audio to be wirelessly transmitted, to the audio preferred WIAG in the context of the send-packet(s)-to-remote-destination service;

(v) when the wireless terminal device (WTD) is in the third mode, the wireless terminal device (WTD) is exclusively wirelessly connected to the video-preferred WIAG; and (v) when the wireless terminal device (WTD) is in the third mode, the send-packet(s)-to-remote-destination service is partially overridden so as to: (A) block-and-cache outgoing packets that were classified as encoding NMS data; (B) block-and-cache outgoing packets that were classified as encoding audio; and (C) allow outgoing packets that were classified as encoding video to be wirelessly transmitted, to the video preferred WIAG gateway in the context of the send-packet(s)-to-remote-destination service, wherein the instructions, that when executed by the processor, require the wireless terminal device (WTD) to operate in each of the first, second and third modes, sequentially in any order and one at a time such that the probing and the designating are performed more than once so that an identity of the NMS-preferred WIAG is changed at least once, an identity the audio-preferred WIAG is changed at least once, and an identity of the video-preferred WIAG is changed at least once.

* * * * *